United States Patent
Johnson et al.

(10) Patent No.: US 12,153,720 B2
(45) Date of Patent: Nov. 26, 2024

(54) PERIPHERAL DEVICE COMPORTABILITY WITH SECURITY CIRCUITRY

(71) Applicant: Google LLC, Mountain View, CA (US)

(72) Inventors: Scott D. Johnson, Cupertino, CA (US); Timothy Jay Chen, Pleasanton, CA (US); Mark David Hayter, Menlo Park, CA (US); Dominic Anthony Rizzo, Mountain View, CA (US); Eunchan Kim, San Jose, CA (US); Michael Stefano Fritz Schaffner, Campbell, CA (US)

(73) Assignee: Google LLC, Mountain View, CA (US)

( * ) Notice: Subject to any disclaimer, the term of this patent is extended or adjusted under 35 U.S.C. 154(b) by 242 days.

(21) Appl. No.: 17/633,541

(22) PCT Filed: Oct. 31, 2020

(86) PCT No.: PCT/US2020/058445
§ 371 (c)(1),
(2) Date: Feb. 7, 2022

(87) PCT Pub. No.: WO2021/087418
PCT Pub. Date: May 6, 2021

(65) Prior Publication Data
US 2022/0292226 A1 Sep. 15, 2022

Related U.S. Application Data

(60) Provisional application No. 62/929,514, filed on Nov. 1, 2019.

(51) Int. Cl.
*G06F 21/76* (2013.01)
*G06F 21/60* (2013.01)
*G06F 21/85* (2013.01)

(52) U.S. Cl.
CPC ............ *G06F 21/76* (2013.01); *G06F 21/602* (2013.01); *G06F 21/85* (2013.01)

(58) Field of Classification Search
CPC ......... G06F 21/76; G06F 21/602; G06F 21/85
(Continued)

(56) References Cited

U.S. PATENT DOCUMENTS

| | | |
|---|---|---|
| 5,713,006 A | 1/1998 | Shigeeda |
| 5,867,717 A | 2/1999 | Milhaupt et al. |

(Continued)

FOREIGN PATENT DOCUMENTS

| | | |
|---|---|---|
| CN | 109844725 A | 6/2019 |
| EP | 0687122 A2 | 12/1995 |

(Continued)

OTHER PUBLICATIONS

"Final Office Action", U.S. Appl. No. 17/633,530, Aug. 31, 2023, 15 pages.

(Continued)

*Primary Examiner* — Badri Narayanan Champakesan
(74) *Attorney, Agent, or Firm* — Colby Nipper PLLC

(57) ABSTRACT

An IC chip can provide silicon root of trust (RoT) functionality. In described implementations, the IC chip includes a processor, an interconnect, and multiple peripheral devices. These comportable circuit components are designed to facilitate interoperability and consistent, expected communications for security circuitry. Each peripheral device includes an interface that adheres to a common framework for interacting with the processor and with other peripheral devices. The interface includes an interconnect interface coupling the peripheral device to the interconnect and an inter-device interface coupling the peripheral device to at least one other peripheral device. The peripheral device is realized based on a peripheral device design code that (Continued)

indicates inter-device signaling in accordance with an inter-device scheme of an interface specification. Manufacturers fabricate the peripheral device, based on the design code, to be physically and logically coupled to another peripheral device in a predictable manner. This fosters more-robust and reliable security circuitry.

20 Claims, 13 Drawing Sheets

(58) Field of Classification Search
USPC .......................................................... 726/26
See application file for complete search history.

(56) References Cited

U.S. PATENT DOCUMENTS

| | | | |
|---|---|---|---|
| 6,070,214 | A | 5/2000 | Ahern |
| 6,286,066 | B1 | 9/2001 | Hayes et al. |
| 7,924,048 | B2 | 4/2011 | Oh et al. |
| 8,123,133 | B2 | 2/2012 | Dubois et al. |
| 9,304,579 | B2 | 4/2016 | Ware et al. |
| 9,728,275 | B2 | 8/2017 | Tsuji et al. |
| 9,792,446 | B2 | 10/2017 | Chan et al. |
| 9,946,899 | B1 * | 4/2018 | Wesson ................ H01L 23/576 |
| 9,953,166 | B2 | 4/2018 | Newell |
| 10,747,908 | B2 | 8/2020 | Martel et al. |
| 10,824,725 | B2 | 11/2020 | Venkataramani |
| 11,087,610 | B2 | 8/2021 | Anderholm et al. |
| 11,475,169 | B2 | 10/2022 | Foltin et al. |
| 11,477,219 | B2 | 10/2022 | Jenkinson et al. |
| 11,574,048 | B2 | 2/2023 | Ho et al. |
| 11,972,033 | B2 | 4/2024 | Johnson et al. |
| 2003/0115503 | A1 * | 6/2003 | Lehman .................. G06F 21/75 714/25 |
| 2007/0055904 | A1 | 3/2007 | Conley et al. |
| 2009/0037747 | A1 * | 2/2009 | Xie ...................... H04L 9/0869 713/192 |
| 2009/0327429 | A1 | 12/2009 | Hughes et al. |
| 2011/0078231 | A1 | 3/2011 | Oliver et al. |
| 2014/0229644 | A1 * | 8/2014 | Thanigasalam ..... G06F 13/4282 710/262 |
| 2016/0180095 | A1 | 6/2016 | Sarangdhar |
| 2016/0378996 | A1 * | 12/2016 | Smith ..................... G06F 21/72 713/190 |
| 2017/0126472 | A1 | 5/2017 | Margalit et al. |
| 2017/0249099 | A1 * | 8/2017 | Jun ......................... G06F 21/76 |
| 2018/0034793 | A1 | 2/2018 | Kibalo et al. |
| 2018/0173665 | A1 | 6/2018 | Mishra et al. |
| 2019/0026478 | A1 * | 1/2019 | Wu .................... H04L 12/40104 |
| 2019/0088096 | A1 | 3/2019 | King et al. |
| 2019/0172047 | A1 * | 6/2019 | Tan ..................... H04L 63/0861 |
| 2019/0180041 | A1 * | 6/2019 | Bhunia ................... G06F 13/28 |
| 2019/0187922 | A1 | 6/2019 | Marley et al. |
| 2019/0327486 | A1 * | 10/2019 | Liao ....................... H04N 19/52 |
| 2020/0004994 | A1 | 1/2020 | Hersham et al. |
| 2020/0310662 | A1 | 10/2020 | Staab et al. |
| 2021/0124711 | A1 | 4/2021 | Ansari et al. |
| 2021/0312092 | A1 * | 10/2021 | Belgarric ............. G06K 19/073 |
| 2022/0292228 | A1 | 9/2022 | Johnson et al. |
| 2024/0184735 | A1 | 6/2024 | Kim et al. |

FOREIGN PATENT DOCUMENTS

| | | |
|---|---|---|
| JP | 2019121410 A | 7/2019 |
| JP | 2019212293 A | 12/2019 |
| JP | 2021507369 A | 2/2021 |
| WO | 2021087417 | 5/2021 |
| WO | 2021087418 | 5/2021 |
| WO | 2022226520 | 10/2022 |

OTHER PUBLICATIONS

"Foreign Office Action", CN Application No. 202080020058.6, Sep. 29, 2023, 25 pages.
"Enhanced Serial Peripheral Interface (eSPI)", Accessed online at: https://www.intel.com/content/dam/support/us/en/documents/software/chipset-software/327432-004_espi_base_specification_rev1.0_cb.pdf on Mar. 30, 2021, Jan. 2016, 130 pages.
"International Preliminary Report on Patentability", Application No. PCT/US2022/071842, Oct. 24, 2023, 8 pages.
"International Search Report and Written Opinion", Application No. PCT/US2022/071842, Jul. 13, 2022, 12 pages.
"Notice of Allowance", U.S. Appl. No. 17/633,530, Dec. 21, 2023, 11 pages.
"Intel Atom Processor C2000 Product Family for Microserver", Datasheet, Jan. 2016, 745 pages.
"International Search Report and Written Opinion", Application No. PCT/US2020/058445, Feb. 16, 2021, 10 pages.
"International Search Report and Written Opinion", Application No. PCT/US2020/058444, Feb. 16, 2021, 11 pages.
Sukhomlinov, et al., "Mitigating Malicious Firmware by Detecting the Removal of a Storage Device", Technical Disclosure Commons; Retrieved from https://www.tdcommons.org/dpubs_series/2378, Aug. 2, 2019, 10 pages.
"Non-Final Office Action", U.S. Appl. No. 17/633,530, Mar. 2, 2023, 14 pages.
"Pursuant to MPEP § 2001.6(b) the applicant brings the following co-pending application to the Examiner's attention: U.S. Appl. No. 17/633,530."
"International Preliminary Report on Patentability", Application No. PCT/US2020/058444, May 3, 2022, 7 pages.
"International Preliminary Report on Patentability", Application No. PCT/US2020/058445, May 3, 2022, 7 pages.
"Foreign Office Action", CN Application No. 202080020060.3, Mar. 22, 2024, 18 pages.
"Foreign Office Action", EP Application No. 20811918.0, May 2, 2024, 5 pages.
"Foreign Office Action", EP Application No. 20812180.6, May 7, 2024, 5 pages.
"Foreign Office Action", CN Application No. 202080020058.6, Jul. 9, 2024, 7 pages.
"Foreign Office Action", CN Application No. 202080020060.3, Sep. 11, 2024, 18 pages.

* cited by examiner

900 ⟶

Receive a peripheral device design code corresponding to a peripheral device for security circuitry, with the peripheral device design code including one or more indications of inter-device signaling
902

↓

Analyze the peripheral device design code including comparing the one or more indications of inter-device signaling to an inter-device scheme of an interface specification for a common framework for communicating at least within the security circuitry
904

↓

Responsive to the analysis, provide a comportability report indicative of whether the peripheral device design code is consistent with the inter-device scheme of the interface specification
906

*Fig. 9*

PERIPHERAL DEVICE COMPORTABILITY WITH SECURITY CIRCUITRY

CROSS-REFERENCE TO RELATED APPLICATION(S)

This application is a national stage entry of International Application No. PCT/US2020/058445, filed Oct. 31, 2020, which claims the benefit of U.S. Provisional Application No. 62/929,514, filed Nov. 1, 2019, the disclosures which are incorporated herein by reference in their entirety.

BACKGROUND

Electronic devices play integral roles in manufacturing, communication, transportation, healthcare, commerce, social interaction, and entertainment. For example, electronic devices power the server farms that provide cloud-based, distributed computing functionality for commerce and communication. Electronic devices are also embedded in many different types of modern equipment, from medical devices to appliances and from vehicles to industrial tools. Personal electronic devices enable portable video viewing and convenient access to smart digital assistants. Additionally, one versatile electronic device—the smartphone—has practically become a necessity to have within arm's reach. With electronic devices becoming pervasive and crucial to many aspects of modern life, device security has become imperative.

Many people are familiar with malware, which is sometimes referred to generically as a "computer virus." Some malware is designed to gain unauthorized access to information stored by an electronic device or to otherwise compromise the electronic device. Several strategies can help keep a user's devices and information safe from security threats by countering certain types of malware. These strategies include employing and regularly updating a resilient operating system, engaging in safe computing practices, and installing an antimalware program. Unfortunately, these strategies cannot make an electronic device invulnerable to all malware attacks.

Further, electronic devices can also be vulnerable to other types of attacks besides those carried out by software-based malware. For example, the safe and reliable operation of electronic devices, as well as the security of information stored by such devices, can be jeopardized by physical attacks on hardware and by radio-frequency attacks against wireless communications. In other words, some forms of attack can circumvent or undermine the strategies listed above to enable a bad actor to compromise an electronic device and potentially gain access to any accounts that are used with the device.

Electronic devices include at least one integrated circuit (IC) that provides the intelligence to enable various functionalities. These functionalities facilitate commerce, streamline healthcare access, provide entertainment, support social media interactions, and enable other services as identified above. An electronic device may also store or otherwise utilize information that is to be safeguarded. To support these functionalities and facilitate safe operation, some electronic devices include hardware-based protection in the form of security circuitry that is part of an IC. Unfortunately, existing approaches to security circuitry are inadequate to combat the varied software, hardware, and wireless attacks that are being unleashed on electronic devices today.

SUMMARY

Certain electronic devices, like server computers and smartphones, are responsible for providing services to users. Users rely on these electronic devices to obtain critical services that are accessed using one or more accounts, like those for financial services or air travel. Because of the linkages between electronic devices and accounts, a compromised electronic device may permit undesired access to the services linked to an account or permit unauthorized access to the account itself. Further, to provide services that are associated with accounts, these electronic devices may store account-related information that is to be safeguarded, such as financial data, usernames, passwords, and secret keys for encryption. Unfortunately, antimalware programs cannot block all avenues of attack against an electronic device. An antimalware program may not, for instance, provide protection against a direct physical attack that uses miniature probes to detect voltage levels on an integrated circuit (IC) chip. Consequently, it is beneficial to incorporate into an electronic device hardware-based measures that can identify, block, repel, or otherwise thwart attacks on the electronic device, including counteracting physical attacks.

An electronic device may therefore include security circuitry to counter attacks from bad actors. In some cases, the security circuitry detects inappropriate or suspicious activity and takes protective action. The security circuitry can be implemented in different manners. For example, computer engineers can fabricate security circuitry as a standalone IC chip or as part of another chip, such as a system-on-a-chip (SoC). In either case, the security circuitry can be part of a protected enclave, a trusted chip platform, a hardware-based root of trust (RoT) (e.g., silicon RoT), or a combination thereof. Regardless of how or where the security circuity is incorporated into an electronic device, computer engineers may design security circuity to counter many different types of attacks, as described next.

Attacks on electronic devices can take the form of programs that observe screen images or monitor repetitive behavior to infer information, applications that attempt to read data from protected areas of memory, direct physical probing of circuitry, and so forth. Security circuitry performs multiple functions to combat one or more of these attacks. For example, security circuitry can protect encryption keys during use, while in transit, or in storage. To do so, dedicated memory and private data buses can be employed. Security circuitry can also generate high-quality pseudorandom numbers or operate a cryptographic engine in an area that is separate from applications that may operate as malware. Further, security circuitry may ensure that hardware is booted using the correct, untampered boot basic input/output system (BIOS).

Security circuitry can therefore be responsible for implementing a diverse suite of functions to combat a wide variety of attacks on electronic devices. Existing approaches to security circuitry, however, employ hardware architectures that are designed on an ad hoc basis. Different circuit portions of the security circuitry may also be designed in relative isolation from one other. Consequently, circuit portions that are designed to combat various security threats may fail to interoperate as intended, leaving hardware less secure. Additionally, poor inter-component communication creates another avenue of attack for would-be bad actors. Further, this ad hoc approach makes the design and testing phases of security circuitry more arduous, lengthier, and more costly. This can lead to some security threats being ignored or inadequately addressed when the security architecture is developed. These ad hoc architectures therefore make protecting electronic devices from diverse and varied security threats more difficult.

In contrast, this document describes approaches that provide an adaptable and flexible framework or platform that can produce resilient and programmable security hardware to combat various forms of attacks on electronic devices. In some implementations for security circuitry, different types of circuits, or circuit portions that provide different security-related functionality, communicate using an expansive protocol that nonetheless produces certain and consistent signaling. The communication protocol enables circuits that provide different security-related functions to interact seamlessly in accordance with a specified design framework.

The design framework and communication protocol produce comportable components such that even circuit components that are designed separately from one another are suitable to be consistently deployed together with stable, predictable interactions. For example, communications and other forms of interactions (e.g., the sharing of resources such as buses, interfaces, or memory) can be at least partially standardized to provide a measure of predictability and interoperability. As used herein, "comportable components" include those components that are designed to adhere to a common framework such that the components are suitable for use together. In some cases, comportability provides a degree of plug-and-play capability between two or more security-related components of an integrated circuit chip.

In some implementations, security circuitry includes multiple peripheral devices in addition to a processor and an interconnect. Each peripheral device of multiple peripheral devices performs some function that contributes to the safety or proper functioning of the security circuitry. Thus, each peripheral device can provide a core or supporting security-related function. The function, like controlling access to data or performing encryption operations, supports an overall purpose of the security circuitry, which includes providing features to enable secure computing by other circuitry and/or ICs of an electronic device. For the sake of predictability and interoperability, each peripheral device may be realized as a comportable component.

To produce a comportable component, each peripheral device can be designed to adhere to a specified communication interface. With each peripheral device communicating in accordance with a same or coordinated communication protocol, the likelihood of interoperability is significantly greater. Computer engineers and computer scientists can therefore focus on designing the security-related functionality of each peripheral device. This enables superior security circuitry to be produced for at least two reasons. First, planned communications between two or more peripheral devices occur as expected because each peripheral device adheres to the same design interface specification. Second, the person-hours invested in the security circuitry can be allocated to designing and testing security functions instead of detecting and debugging inter-component communication issues.

In example implementations, each peripheral device includes an interface that is designed to adhere to an interface specification to use a common or coordinated communication protocol. The communication interface can include an interconnect interface to interact with a main interconnect or a host processor, an inter-device interface to interact with other peripheral devices, or another interface for other signals that enter or depart a given peripheral device. The other interface can specify how the peripheral device communicates using one or more clock signals, with at least one chip input/output interface, with at least one interrupt signal, and so forth. To produce an inter-device interface, for instance, design code for a peripheral device is prepared based on an inter-device scheme of the interface specification. Accordingly, the design code identifies attributes, like inter-device signals, that the peripheral device is to use.

The interface specification can also define a register interface for peripheral devices. Here, each register of the register interface can be used for control, status, or communication. For example, interrupt registers can be instantiated for communication between, for example, a peripheral device and a processor. An interrupt register can include an interrupt enable indication, an interrupt state indication, and an interrupt test indication. These indications can be used to provide a consistent interaction between the host processor and the peripheral device to handle interrupts. In other implementations, peripheral devices engage in comportable communications for alert handling and alert escalation.

In these manners, security circuitry can be incorporated into a silicon RoT chip and/or an SoC. The security circuitry includes multiple peripheral devices that are each comportable with other peripheral devices to ensure expected compatibility and consistent communications between peripheral devices. By adhering to a communication framework, design efforts of peripheral devices can focus on the security-related functionality. Thus, adaptable and diverse security responses can be implemented in a predictable manner by leveraging defined inter-device communications as set forth in a communication interface specification.

Aspects described below include an integrated circuit for peripheral device comportability with security circuitry. The security circuitry of the integrated circuit includes an interconnect, a processor coupled to the interconnect, and multiple peripheral devices. Each respective peripheral device is coupled to the interconnect and includes an interface configured to adhere to a common framework for interacting with the processor and with other peripheral devices of the multiple peripheral devices. The interface includes an interconnect interface configured to couple the respective peripheral device to the interconnect. The interface also includes an inter-device interface configured to couple the respective peripheral device to the other peripheral devices of the multiple peripheral devices.

Aspects described below include a method for peripheral device comportability with security circuitry that can be performed by at least part of an integrated circuit. The method includes communicating, by a processor over an interconnect, with a peripheral device of multiple peripheral devices in accordance with a common framework for interaction between the processor and the multiple peripheral devices based on an interconnect scheme. The method also includes communicating, by the peripheral device over the interconnect, with the processor in accordance with the common framework based on the interconnect scheme. The method further includes communicating, by the peripheral device, with another peripheral device of the multiple peripheral devices in accordance with the common framework for interaction between at least two peripheral devices of the multiple peripheral devices based on an inter-device scheme.

Aspects described below include a method for peripheral device comportability with security circuitry that can be performed by at least part of an integrated circuit. The method includes receiving a peripheral device design code corresponding to a peripheral device for the security circuitry, with the peripheral device design code including one or more indications of inter-device signaling. The method also includes analyzing the peripheral device design code, including comparing the one or more indications of inter-device signaling to an inter-device scheme of an interface specification for a common framework for communicating at least within the security circuitry. The method further includes, responsive to the analyzing, providing a comportability report indicative of whether the peripheral device design code is consistent with the inter-device scheme of the interface specification.

BRIEF DESCRIPTION OF THE DRAWINGS

Apparatuses of and techniques for peripheral device comportability with security circuitry are described with reference to the following drawings. The same numbers are used throughout the drawings to reference like features and components.

FIG. 5-1 illustrates an example peripheral device including a register interface and example communication signals.

FIG. 5-2 illustrates an example register interface with multiple interrupt entries.

FIG. 5-3 illustrates an example interrupt entry.

FIG. 5-4 illustrates an example timing diagram for handling interrupts between a peripheral device and a processor.

FIG. 9 illustrates other example methods for an apparatus to implement peripheral device comportability with security circuitry.

DETAILED DESCRIPTION

Overview

Figure 1:
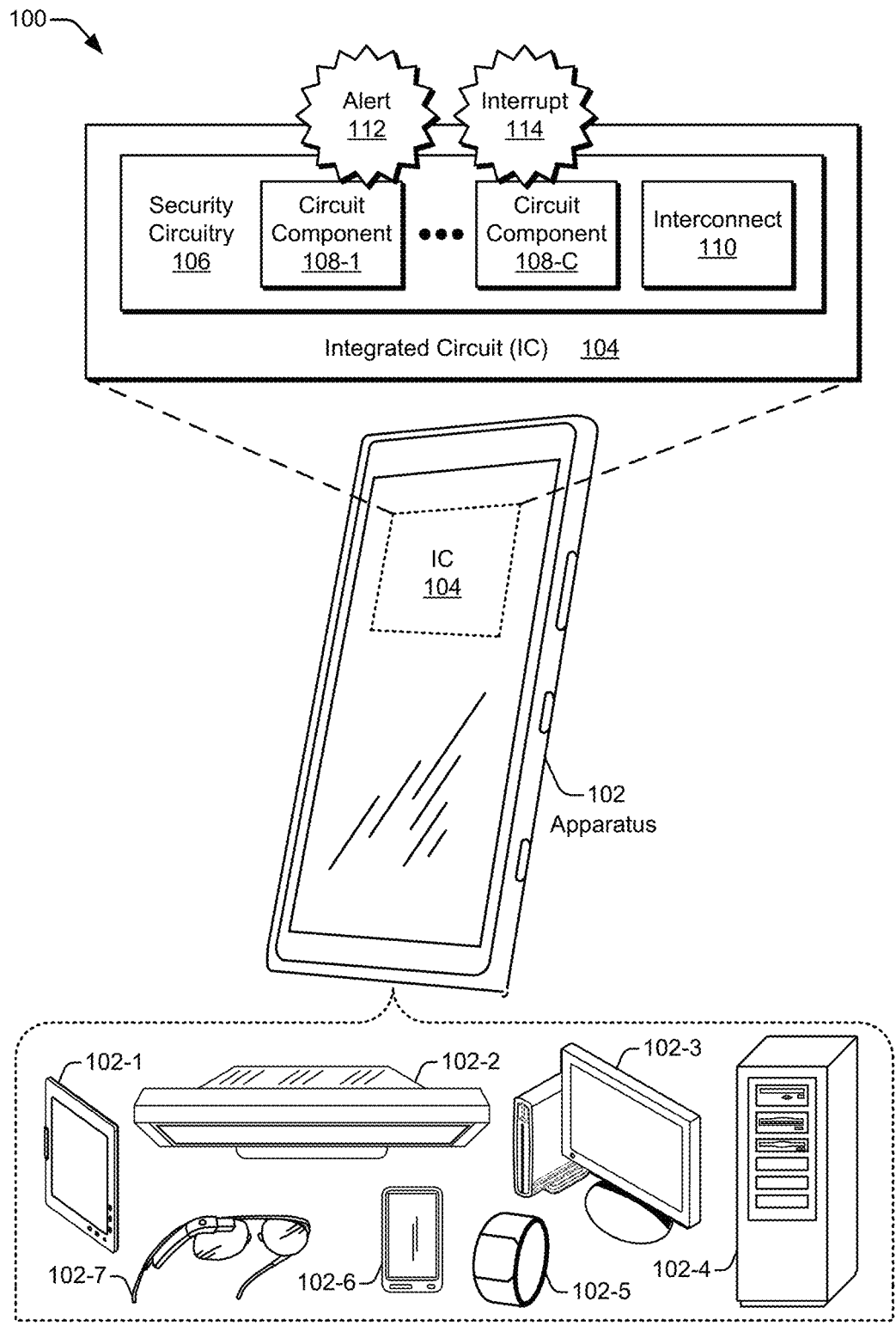
FIG. 1 illustrates an example apparatus with an integrated circuit (IC) that includes security circuitry in which peripheral device comportability can be implemented.

Electronic devices make crucial contributions to modern society, such as those for communication, safety, and manufacturing. Each electronic device relies on an integrated circuit (IC) that has processing capabilities to provide some functionality. With the critical nature of so many of these functionalities, an electronic device may include an IC with security circuitry to provide protection. The security circuitry reduces the chances that information is inadvertently exposed or that some function is used in a harmful or otherwise unauthorized manner. Security circuitry can be realized in a multitude of forms, one of which involves the root of trust (RoT) paradigm.

With RoT silicon, a hardware-based mechanism keeps computing safe in terms of preventing inappropriate access to information, deterring unauthorized use of a device, and so forth. Silicon RoT principles can help ensure that hardware infrastructure and the software that executes thereon both remain in their intended, trustworthy state. To do so, the silicon RoT can verify that critical system components boot securely using authorized and verifiable code. Thus, it can ensure that a server or another electronic device boots with the correct firmware and that the firmware has not been infected by low-level malware. Silicon RoT can provide additional or alternative security benefits. For example, it can provide a cryptographically unique machine identity; this unique identity enables an operator to verify that an electronic device is legitimate. Further, it can maintain encryption keys and other information in a tamper-resistant silo, which prevents even those with physical access to a device from obtaining the information. RoT services that are anchored in hardware can also offer authoritative, tamper-evident audit records and other runtime security services.

Chip designers can incorporate silicon RoT technology into individual IC chips that focus on providing security functions. Alternatively, RoT silicon can be integrated with other circuitry, including in a central processing unit (CPU) chip or package, in a graphics processing unit (GPU) chip or card, in a system-on-a-chip (SoC), in a memory storage device, and so forth. Generally, security circuitry can operate in server motherboards, network cards, client devices (e.g., laptops and smartphones), consumer routers, internet-of-things (IoT) devices, and fixed and portable storage units, just to name a few examples. By anchoring the RoT in silicon, computing security is enhanced across hardware, firmware, and software levels regardless of application or electronic device. Silicon RoT also enhances security across different devices that are in communication with each other directly or via a network. Although some security and circuit design principles are described in this document using a silicon or hardware RoT environment, this is done by way of example only, for the described principles are applicable to security circuitry generally.

In today's computing environment, bad actors can attack electronic devices at a myriad of levels using a multitude of attack vectors. For example, an attack can be made using malware that is transmitted over the internet to attempt to obtain information that is stored in a laptop but that a user wishes to be safeguarded. Also, an attack may involve injecting malware into firmware that is used to boot an electronic device, like a Wi-Fi® router or an IoT device, during transportation of the device or while the device operates in an unobserved location. As another example, a bad actor may steal an electronic device and have ample time to perpetrate direct physical attacks on the device. Such direct physical attacks can include severing wires, probing voltages, repeatedly running code to observe trends and infer information, and so forth.

Security circuitry can therefore be responsible for implementing a diverse suite of functions to combat a wide variety of attacks on electronic devices. Existing approaches to security circuitry, however, employ hardware architectures that are designed on an ad hoc basis. Different circuit portions of the security circuitry may also be designed in relative isolation from one other. Consequently, circuit portions that are designed to combat various security threats may fail to interoperate as intended, leaving hardware less secure. Additionally, poor inter-component communication creates another avenue of attack for would-be bad actors. Further, this ad hoc approach makes the design and testing phases of security circuitry more arduous, lengthier, and more costly. This can lead to some security threats being ignored or inadequately addressed when the security architecture is developed. These ad hoc architectures therefore make protecting electronic devices from diverse and varied security threats more difficult.

In contrast, this document describes approaches that provide an adaptable and flexible framework or platform that can produce resilient and programmable security hardware to combat various forms of attacks on electronic devices. In some implementations for security circuitry, different types of circuits, or circuit portions that provide different security-related functionality, communicate using an expansive protocol that nonetheless produces certain and consistent signaling. The communication protocol enables circuits that provide different security-related functions to interact seamlessly in accordance with a specified design framework.

The design framework and communication protocol produce comportable components such that even circuit components that are designed separately from one another are suitable to be consistently deployed together with stable, predictable interactions. For example, communications and other forms of interactions (e.g., the sharing of resources such as buses, interfaces, or memory) can be at least partially standardized to provide a measure of predictability and interoperability. As used herein, "comportable components" include those components that are designed to adhere to a common framework such that the components are suitable for use together. In some cases, comportability provides a degree of plug and play capability between two or more security-related components of an integrated circuit chip.

In some implementations, security circuitry includes multiple peripheral devices in addition to a processor and an interconnect. Each peripheral device of multiple peripheral devices performs some function that contributes to the safety or proper functioning of the security circuitry. Thus, each peripheral device can provide a core or supporting security-related function. The function, like controlling access to data or performing encryption operations, supports an overall purpose of the security circuitry, which includes providing features to enable secure computing by other circuitry and/or ICs of an electronic device. For the sake of predictability and interoperability, each peripheral device may be realized as a comportable component.

To produce a comportable component, each peripheral device can be designed to adhere to a specified communication interface. With each peripheral device communicating in accordance with a same or coordinated communication protocol, the likelihood of interoperability is significantly greater. Computer engineers and computer scientists can therefore focus on designing the security-related functionality of each peripheral device. This enables superior security circuitry to be produced for at least two reasons. First, planned communications between two or more peripheral devices occur as expected because each peripheral device adheres to the same design interface specification. Second, the person-hours invested in the security circuitry can be allocated to designing and testing security functions instead of detecting and debugging inter-component communication issues.

In example implementations, each peripheral device includes an interface that is designed to adhere to an interface specification to use a common or coordinated communication protocol. The communication interface can include an interconnect interface to interact with a main interconnect or a host processor, an inter-device interface to interact with other peripheral devices, or another interface for other signals that enter or depart a given peripheral device. The other interface can specify how the peripheral device communicates using one or more clock signals, with at least one chip input/output interface, with at least one interrupt signal, and so forth. To produce an inter-device interface, for instance, design code for a peripheral device is prepared based on an inter-device scheme of the interface specification. Accordingly, the design code identifies attributes, like inter-device signals, that the peripheral device is to use. Examples of peripheral device interfaces and design code analyses are described below with reference to FIGS. 3, 4, and 5-1.

The interface specification can also define a register interface for peripheral devices. Here, each register of the register interface can be used for control, status, or communication. For example, interrupt registers can be instantiated for communication between, for example, a peripheral device and a processor. An interrupt register can include an interrupt enable indication, an interrupt state indication, and an interrupt test indication. These indications can be used to provide a consistent interaction between the host processor and the peripheral device. Examples of utilizing interrupts in security circuitry in a comportable manner are described below with reference to FIGS. 5-2 to 5-4. This document also describes other aspects and implementations for peripheral device comportability with security circuitry. Each of these aspects and implementations described herein may be used individually or in any combination.

In other implementations, device peripherals can exchange alerts. Generally, alerts are deemed more important or more concerning than interrupts. In other words, security risks that should not be ignored in a RoT or other secure silicon environment may be designated as alerts instead of as a basic or default processor interrupt. Nonetheless, a system can still attempt to leverage the intelligence and resources of the processor to address a potential security event. If the processor fails to address the interrupt, then a peripheral device called an alert handler takes remedial action, including possibly directing activation of a security countermeasure. In accordance with described implementations, other peripheral devices can transmit an alert indication to the alert handler in a prescribed manner. Signaling pathways between modules in the alert handler and those in peripheral devices can be implemented with differential paths to promote resiliency. Further, the alert handler or the alert-sending peripheral device can include integrity fail circuitry that checks the signaling pathways for correct differential functionality. In still other implementations, an alert handler escalates unresolved alerts, and an escalation handler can activate a countermeasure in response. Examples of alert handling and escalation, including associated communication signaling that can be made comportable, are described below with reference to FIGS. 6 and 7.

In these manners, security circuitry can be incorporated into a silicon RoT chip and/or an SoC. The security circuitry includes multiple peripheral devices that are each comportable with other peripheral devices to ensure expected compatibility and consistent communications between peripheral devices. By adhering to a communication framework, design efforts of peripheral devices can focus on the security-related functionality. Thus, adaptable and diverse security responses can be implemented in a predictable manner by leveraging defined inter-device communications as set forth in a communication interface specification. Although some aspects of comportability are described in a security circuitry environment, the disclosed comportability concepts are applicable to designing, creating, and operating circuitry of other types and purposes.

Example implementations in various levels of detail are discussed below with reference to the associated figures. The discussion below first sets forth an example operating environment and then describes example hardware, schemes, and techniques. Example methods are described thereafter with reference to flow charts or diagrams. Finally, an example computing device is described.

Example Operating Environment for Peripheral Device Comportability with Security Circuitry FIG. 1 illustrates, at 100 generally, an example apparatus 102 with an integrated circuit 104 (IC 104) that includes security circuitry 106. The apparatus 102, the integrated circuit 104, and/or the security circuitry 106 can implement peripheral device comportability with security circuitry as described herein. In this example, the apparatus 102 is depicted as a smartphone. The apparatus 102 may, however, be implemented as any suitable computing or electronic device.

Examples of the apparatus 102 include a mobile electronic device, mobile communication device, modem, cellular or mobile phone, mobile station, gaming device, navigation device, media or entertainment device (e.g., a media streamer or gaming controller), laptop computer, desktop computer, tablet computer, smart appliance, vehicle-based electronic system, wearable computing device (e.g., clothing, watch, or reality-altering glasses), Internet of Things (IoTs) device, sensor, stock management device, electronic portion of a machine or piece of equipment (e.g., vehicle or robot), memory storage device (e.g., a solid-state drive (SSD)), server computer or portion thereof (e.g., a server blade or rack or another part of a datacenter), and the like. Illustrated examples of the apparatus 102 include a tablet device 102-1, a smart television 102-2, a desktop computer 102-3, a server computer 102-4, a smartwatch 102-5, a smartphone (or document reader) 102-6, and intelligent glasses 102-7.

In example implementations, the apparatus 102 includes at least one integrated circuit 104. The integrated circuit 104 can be mounted on a module, card, or printed circuit board (PCB) (not shown). Examples of a PCB include a flexible PCB, a rigid PCB, a single or multi-layered PCB, a surface-mounted or through-hole PCB, combinations thereof, and so forth. Each integrated circuit 104 can be realized as a general-purpose processor, a system-on-a-chip (SoC), a security-oriented IC (e.g., a RoT IC chip), a memory chip, a communications IC (e.g., a modem or radio-frequency IC), a graphics processor, an artificial intelligence (AI) accelerator, combinations thereof, and so forth. The integrated circuit 104 can be packaged alone or together with other IC chips.

Figure 2:
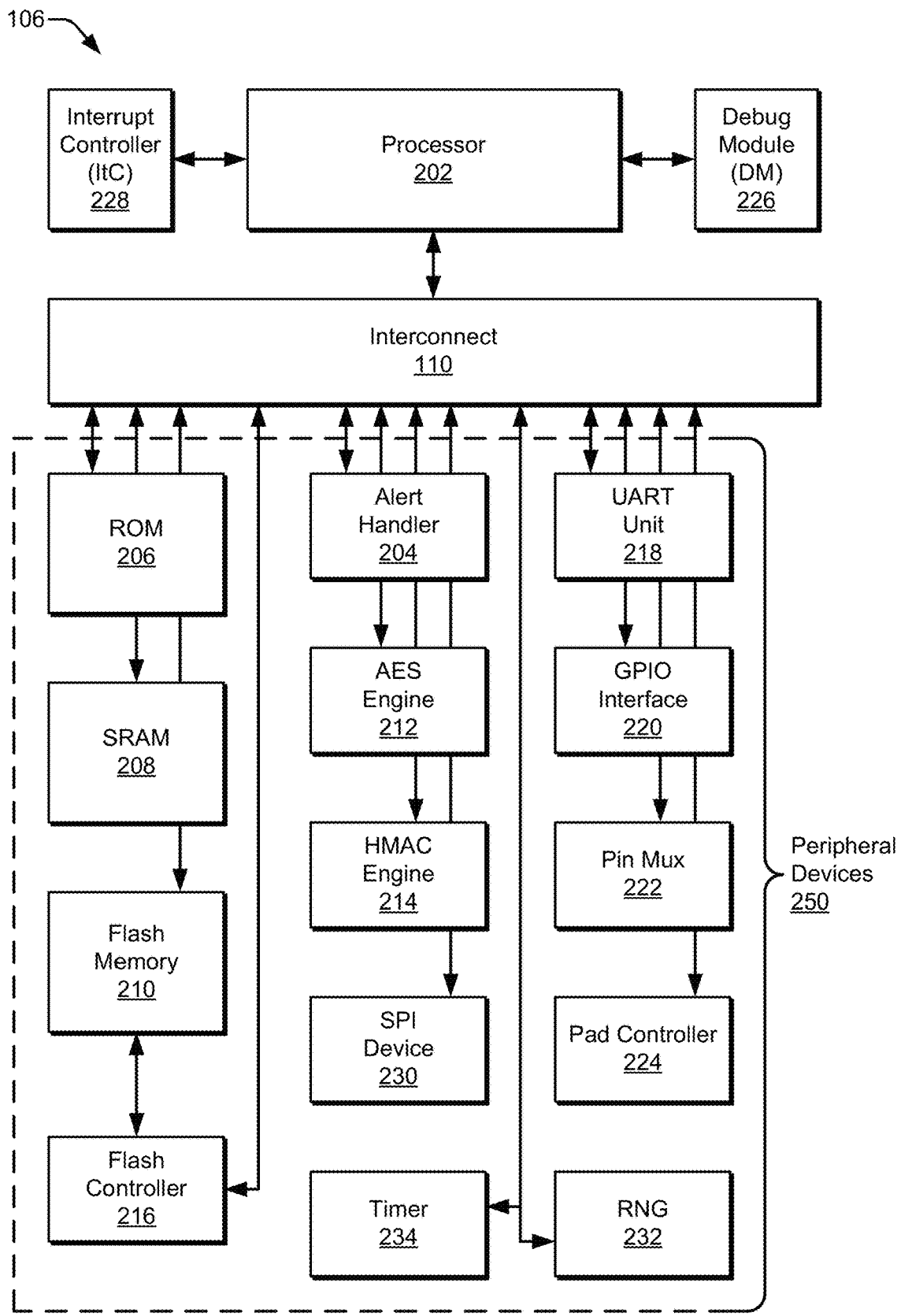
FIG. 2 illustrates example security circuitry that includes multiple circuit components, including multiple example peripheral devices that can be implemented to be comportable.

As shown, the integrated circuit 104 includes security circuitry 106. The security circuitry 106 can include a variety of parts, including multiple circuit components 108-1 . . . 108-C, where C represents a positive integer, and an interconnect 110. Examples of circuit components 108, in addition to the interconnect 110, include a processor and multiple peripheral devices. These are depicted in FIG. 2 and described below. Although not explicitly shown in FIG. 1, the integrated circuit 104 may include other portions besides the security circuitry 106. While the multiple circuit components 108-1 . . . 108-C and the interconnect 110 may be integrated together on a single IC as shown, the components may alternatively be distributed across two or more ICs. The security circuitry 106 can be realized as, for example, a protected enclave, a trusted chip platform, a hardware-based root of trust (RoT) chip (e.g., a silicon RoT), and so forth. Regardless of how or where the security circuitry 106 is incorporated into an electronic device, the security circuitry 106 may counter many different types of attacks.

In example operations, once an attack—or a potential attack—or an anomalous occurrence is detected, an alert 112 or an interrupt 114 is generated by some component. For example, a circuit component 108 can generate an alert 112 and can transmit the alert 112 to an alert handler, which is described below. Additionally or alternatively, another circuit component 108 can generate an interrupt 114 for handling by the processor. The alert 112, the interrupt 114, and other signals are communicated between two or more components 108 in accordance with a common framework for interactions between the processor and/or peripheral devices of the security circuitry 106. The common framework can specify interfaces at each peripheral device and signaling to promote interoperability and use of consistent communication protocols across multiple peripheral devices. Thus, while some aspects of comportability are presented in terms of security circuitry, peripheral device comportability can also be employed with other types of circuitry. This document describes example frameworks, as well as example communication interfaces. Example communication interfaces and interface specifications are described with reference to FIGS. 3 and 4. Example signaling schemes and corresponding hardware, with a focus on interrupts, are described below with reference to FIGS. 5-1 through 5-4. With reference to FIG. 2, however, example architectures of the security circuitry 106 are described next.

FIG. 2 illustrates example security circuitry 106 that includes multiple circuit components, including multiple example peripheral devices 250 that can be implemented to be comportable. As shown, the security circuitry 106 includes a processor 202 that is coupled to an interconnect 110. The interconnect 110 can be realized using, for example, a bus, a switching fabric, or a bus network that enables the various circuit components to communicate. The multiple circuit components 108-1 . . . 108-C (of FIG. 1) can include, besides the interconnect 110 and the processor 202, multiple memories and multiple peripheral devices. Each of the processor 202, the multiple memories, and the multiple other peripheral devices 250 is directly or indirectly coupled to the interconnect 110.

In example implementations, the multiple memories can include a read-only memory 206 (ROM 206), a static random-access memory 208 (SRAM 208), and a flash memory 210. The multiple peripheral devices 250 can include an alert handler 204, an advanced encryption standard (AES) engine 212 (AES engine 212), a hash-based message authentication code (HMAC) engine 214 (HMAC engine 214), a serial peripheral interface (SPI) device 230 (SPI device 230), and a flash controller 216. The multiple peripheral devices 250 can also include a universal asynchronous receiver/transmitter (UART) unit 218 (UART unit 218), a general-purpose input/output (GPIO) interface 220 (GPIO interface 220), a pin multiplexer 222 (pin mux 222), and a pad controller 224. The multiple peripheral devices 250 can further include a random number generator 232 (RNG 232) and a timer 234. Additionally, the peripheral devices 250 can include any of the memories, as shown in FIG. 2. Although certain examples of memories and other peripheral devices 250 are depicted in FIG. 2 or described herein, a given implementation of the security circuitry 106 may include more, fewer, and/or different instances of processors, controllers, memories, modules, or peripheral devices, including duplicates thereof.

The illustrated circuit components can be operated synchronously based on one or more clock signals. Although not shown in FIG. 2, the security circuitry 106 may include at least one clock generator to generate the clock signals or may include reset circuitry to reset one or more individual components independently of each other, multiple components jointly, or an entire IC chip. Alternatively, the security circuitry 106 may receive at least one clock signal or a reset signal from a source that is external to the security circuitry 106, which source may or may not be on a separate chip. One or more separate peripheral devices 250 may operate in respective individual clock domains. For instance, input/output (I/O) peripheral devices may be synchronized to a clock that is local to a respective I/O device or channel. Peripheral devices in different clock domains may operate or communicate asynchronously with respect to one another.

Example implementations of the illustrated components are described below. The processor 202 may be realized as a "main," "central," or "core" processor for the security circuitry 106. The processor 202 may, by way of example only, be implemented with a 32-bit, in-order reduced instruction set computing (RISC) core with a multi-stage pipeline. With, e.g., a RISC-V functionality, the processor may implement an M (machine) and a U (user) mode. Activating a reset pin (not shown) (e.g., through de-assertion of an active-low reset pin) causes the processor 202 to exit reset and begin executing code at its reset vector. The reset vector may begin in the ROM 206, which validates code in the emulated embedded flash (e-flash) before jumping to it. In other words, the code is expected to have been instantiated into the e-flash before the reset is released. In some cases, resets throughout the security circuitry 106 can be made asynchronous active low as per a comportability specification to support interoperability among the various circuit components. A reset may be generated by the alert handler 204 as a security countermeasure; by a watchdog timer; and so forth. Reset signals may also be sent to other circuit components, such as one of the memories or one of the other peripheral devices 250.

Coupled to the processor 202 are a debug module 226 (DM 226) and an interrupt controller 228 (ItC 228), either of which may also be made comportable. The debug module 226 provides debug-access to the processor 202. By interfacing with certain pins of the IC, logic in the debug module 226 allows the processor 202 to enter a debug mode and provides an ability to inject code into the device (e.g., by emulating an instruction) or into a memory. The interrupt controller 228 may be disposed proximate to the processor 202. The interrupt controller 228 can accept a vector of interrupt sources from within the security circuitry 106. The interrupt controller 228 can also assign leveling and priority to the interrupts before forwarding them to the processor 202 handling.

The processor 202 can provide any desired level of performance or include any internal circuit components. For example, the processor 202 can include at least one arithmetic logic unit (ALU) (e.g., including an "additional" ALU to calculate branch targets to remove a cycle of latency on taken conditional branches) and multiple pipeline stages. With multiple pipeline stages, a pipeline can perform register writeback to reduce a cycle of latency from loads and stores and prevent a pipeline stall where a response to a load or store is available the cycle after the request. The processor 202 can implement a single-cycle multiplier or produce an imprecise exception on an error response to a store, which allows the processor to continue executing past a store without waiting for the response. Although not depicted, the processor 202 specifically, or the security circuitry 106 generally, can include an instruction cache to provide single-cycle access times for instructions.

In the illustrated example, the security circuitry 106 includes three memory address spaces for instructions and data. The ROM 206 is the target for the processor 202 after release of a reset. The ROM 206 contains hard-coded instructions to perform a subset of platform checking before checking the next stage of code. The next stage of code—e.g., a boot loader stored in e-flash memory—can be the first piece of code that is not hard-coded into the silicon of the device. This next stage of code is, therefore, signature-checked for integrity to increase security. The ROM 206 can execute this signature check by implementing an RSA-check algorithm on the full contents of the boot loader.

The flash memory 210 can be implemented as e-flash memory for code storage. This e-flash can house the boot loader mentioned above, as well as an operating system and applications that layer on top. The SPI device 230 can be used to bulk-load the e-flash memory. The debug module 226 may also be used for code loading. The SRAM 208 can be operated as a scratch pad SRAM that is available for data storage by the processor 202 (e.g., for stack and heap information). The SRAM 208 can also store code.

The security circuitry 106 can include a suite of "peripherals" or "peripheral devices." These peripheral devices 250 may be subservient execution units that are coupled to the processor 202 via the interconnect 110. Each of these peripheral devices 250 can follow an interface framework that ensures comportability with each other and with the processor 202. A comportability scheme can specify how the processor 202 communicates with a given peripheral device (e.g., using the interconnect 110), how a peripheral device communicates with the chip I/O (e.g., via a fixed or multiplexable I/O), how a peripheral device communicates with the processor 202 (e.g., using interrupts), how a peripheral device communicates security events (e.g., using alert indications) to other circuit components, like the alert handler 204; how a peripheral device communicates with other peripheral devices (e.g., via at least one register, synchronously, or asynchronously); or combinations thereof. The depicted peripheral devices 250 can comprise peripheral devices relative to the alert-related functionality provided by the alert handler 204, relative to the processor 202, relative to one or more the memories, relative to a chip I/O, and so forth. Thus, the memories can also comprise peripheral devices 250 relative to each other or the other depicted circuit components.

Circuit or chip I/O peripherals include the pin mux 222 and the pad controller 224. The pin mux 222 provides signaling routes between at least a portion of the peripheral devices 250 and available multiplexable I/O nodes of the security circuitry 106 (e.g., pins of the chip in which the various components are integrated or an interface to other portions of an SoC). The pad controller 224 manages control or pad attributes like drive strength, technology, pull up versus pull down, and the like of each of the circuits' (e.g., the chip's) external I/O. The pin mux 222 and the pad controller 224 are themselves peripheral devices on the interconnect 110. Accordingly, each may have or may otherwise be associated with at least one collection of registers that provide software configurability.

The UART unit 218 can implement UART features, such as single-lane duplex UART functionality. The outputs and inputs thereof can be configured to connect to any circuit I/O via the pin mux 222. The GPIO interface 220 creates G bits of bidirectional communication to external circuitry via the pin mux 222, where G is a positive integer like 16, 32, or 64. Regarding memory I/O, the SPI device 230 can implement a firmware mode. Here, the firmware mode can enable a feature that provides the ability for external drivers to send firmware upgrade code into a bank of the flash memory 210 for in-field firmware updates. The firmware mode can include addressing of the memories using SPI transactions. Although not depicted, the security circuitry 106 can include an inter-integrated circuit (I2C) host to enable command of I2C devices. This command of I2C devices may include standard, full, and fast modes.

Several "core security" peripherals are also depicted, including the encryption engines and the alert handler 204. The AES engine 212 can provide symmetric encryption and decryption using one or more protocols and varying key sizes, like 128 b, 192 b, or 256 b. The component can select encryption or decryption of data that arrives in, e.g., 16-byte quantities to be encrypted or decrypted using different block cipher modes of operation. The AES engine 212 can support electronic codebook (ECB) mode, cipher block chaining (CBC) mode, cipher feedback (CFB) mode, output feedback (OFB) mode, counter (CTR) mode, and the like. Data transfer can be made processor-available, e.g., key and data material may be passed into the cryptographic engine via register writes. Alternatively, private channels for the transfer of key and data material may be included to reduce exposure from potentially untrusted processor activity.

The HMAC engine 214 may utilize, for instance, a secure hash algorithm (SHA) SHA-256 as a hashing algorithm. SHA-256 is a member of the SHA-2 family of hashing algorithms in which the digest (or hash output) is of 256 b length, regardless of the data size of the input to be hashed. The data is sent into the HMAC peripheral device after declaring the beginning of a hash request. This zeroes out the internal state to initial conditions, e.g., 32 b at a time. Once the data has been sent by a component client, the client can indicate the completion of the hash request (with optional partial-word final write). In accordance with an example portability interface scheme, the HMAC engine 214 produces the hash result and makes it available for register read by the requesting client. The data transfer may be made processor-available or may be made private to reduce exposure to potentially untrusted processor activity.

HMAC is a message authentication protocol layered on top of a hashing function (e.g., SHA-256), and HMAC mixes in a secret key for cryptographic purposes. HMAC is a particular application of appending the secret key in a prescribed manner, such as twice, around the hashing (via SHA-256) of the message. To provide this functionality, a 256 b key may be programmed into the circuit component before the message hash begins. The timing of authentication completion can vary and may be longer in latency than using native SHA-256. Here again, the hashing information or the secret key may be made processor-available for convenience or processing efficiency or may be rendered private in some manner for increased security.

The alert handler 204 is responsible for processing and responding to alerts, including ones provided from other peripheral devices 250. The alerts can be considered security-sensitive interrupts that are to be handled in a timely manner to respond to a perceived security threat. Unlike "standard" interrupts, alerts are not handled solely by software executing on the processor 202. Alerts can trigger a first-stage request to be handled by software as a "regular" interrupt. If, however, the software is not able to respond and properly remedy the alert-triggered interrupt, then the alert handler 204 triggers a second-stage response. The second-stage response can include enacting a security countermeasure, including terminating a process, erasing or otherwise deleting data, withdrawing power from a circuit portion, or resetting an IC chip or portion thereof. This ensures that the underlying issue—the perceived security threat—is addressed even if the processor 202 is busy, wedged, or also under attack.

Thus, an alert 112 (e.g., of FIG. 1) can be implemented as an elevated interrupt-type signal or alert indication that the alert handler 204 receives from other peripheral devices and that is indicative of a potential security threat. In operation, the alert handler 204 can gather alerts from other circuit components 108 of the security circuitry 106 and convert them into interrupts that the processor 202 can address. If the processor 202 does not clear the interrupt, however, the alert handler 204 provides hardware responses to address the potential security threat.

For some inter-device communications, the alert handler 204 receives differentially signaled synchronous or asynchronous alert indications from peripheral device sources. The peripheral devices 250 can generate alerts based on the functions, knowledge, or sensed parameters of the peripheral devices 250. For other inter-device communications, the alert handler 204 performs ping testing of the alert sources as a robust heartbeat mechanism. A ping monitor of the alert handler 204 (not explicitly shown) requests periodic alert responses from each alert source to ensure communication channels with the alert sources are functioning.

The alert handler 204 can also produce locally sourced hardware alerts based on communication failures. A first locally sourced alert is generated if differential signaling or another prescribed communication protocol with an alert source or an escalation handler fails (e.g., if a signal-integrity check fails). The alert handler 204 generates a second such alert if an alert source or an escalation handler fails to respond to a ping request. Generally, the alert handler 204 can receive incoming alerts from throughout the system, classify the alerts, issue interrupts based on the classified alerts, and escalate interrupts to hardware-based responses if the processor 202 does not clear an issued interrupt. The alert handler 204 can therefore act—e.g., as a stand-in for security responses—if the processor cannot or does not handle a security alert.

In some architectures, a security alert is intended to be a rare event, at least relative to "standard" interrupts. Accordingly, at a design stage, a possible event may be designated as an alert event to the extent the event is expected to not happen frequently and if the event has potential security consequences. Examples of such events are parity errors (which might indicate an attack), unauthorized actions on cryptographic or security-related components, sensed values from physical sensors indicating environmental modification (e.g., voltage or temperature), and so forth. The system routes alerts through the alert handler 204, which converts the alerts to interrupts for the processor 202 to potentially address. An underlying expectation, for some implementations, is that a secure operating system has a protocol for handling in software any such interrupt that arises due to an alert. If so, the secure operating system can usually resolve the interrupt and then clear the interrupt with the alert handler 204.

Each peripheral device 250 can present a list of individual alerts that represent respective potential threats to be handled. Peripheral devices can transmit an alert as an alert indication to the alert handler 204 using a particular encoding mechanism. Comportable communication signaling schemes for handling alerts are described below with reference to FIGS. 6 and 7. The signaling scheme of FIG. 6 relates to communications between the alert handler 204 and another peripheral device 250 that may generate an alert. The signaling scheme of FIG. 7 relates to communications between the alert handler 204 and an event handler (not shown in FIG. 2) that can implement a security countermeasure responsive to an escalation command from the alert handler 204 after suitable escalation of a triggered alert.

The security circuitry 106 can also include the RNG 232. Generally, randomness can contribute to the security functionality by providing variations in execution that can keep attackers from predicting a good time to launch an attack. A random number, for instance, can provide secret material used for identity and cryptographic purposes. The RNG 232 can be seeded into algorithmic computation to obscure sensitive data values. Generally, the RNG 232 provides better performance as its number generation increasingly becomes truly random and to the extent it can also be hardened against attack. The RNG 232 may be implemented as a "true" RNG (TRNG), which may involve a design having an analog portion to take advantage of some physical event or process that is non-deterministic. Example TRNG designs rely on metastability, electronic noise, timing variations, thermal noise, quantum variation, and so forth. The TRNG filters the resulting variable(s) and sends them into a pool of entropy that the device can sample at a given time for a current randomized function. In some cases, an interface to the entropy pool can include a read request of available random bits. The TRNG interface indicates how many bits are available, and the requesting peripheral device or software can read from this pool to the extent bits are available. Attempted reading of entropy bits that are not available can trigger an interrupt or an alert.

Two other peripheral devices 250 include the timer 234 and the flash controller 216, the latter of which is described in the following paragraph. The timer 234 can, for example, support accurate performance by the processor 202. The timer 234 is formed from multiple bits (e.g., 64 bits) and operates as a free-running timer with a guaranteed frequency to within some percentage. Another timer (not explicitly shown) can act as a watchdog timer to backstop the processor 202 in case the processor becomes unresponsive. The unresponsiveness may be due to development code that is wedged, a security attack, and so forth.

The flash controller 216 controls the flash memory 210, which is available for code and data storage. The primary read path for this data can be in the standard memory address space. Writes to that address space can be ignored, however, because flash is not written to in a standard way. Instead, to write to the flash memory 210, software interacts with the flash controller 216. The flash functionality can include three primary commands: read, erase, and program. Read commands can be standardized and can use the chip memory address space. Erase commands are performed at a page level, where the page size is parameterizable by the flash controller 216. Upon receiving an erase request, the flash controller 216 wipes the contents of the target page, which renders the data into a "1" state (e.g., 0xFFFFFFFF per word). Afterward, software can program individual words to any value. A flash bit is not returned to a "1" state without another erase, so future content is effectively changed with an AND of the current content and the written value. Erase and program commands are relatively slow. A typical erase time is measured in milliseconds, and program times are in the range of microseconds. Security is also a concern because secret data may be stored in the flash memory 210. Some memory protection can therefore be provided by the flash controller 216.

The security circuitry 106 is depicted in FIG. 2 with a particular set of circuit components. A given security circuitry 106 can, however, have more, fewer, or different circuit components. The circuit components may also be interconnected differently or operate in manners besides those example manners described above. Further, some circuit components may be omitted while other circuit components are implemented in multiple instances. For example, the alert handler 204 may be duplicated or distributed, or multiple AES encryption engines 212 may be present in some security circuitry 106. Further, a GPIO interface 220 may be omitted from among the peripheral devices 250 of security circuitry 106 for IC chips in which the security circuitry 106 forms but one core among dozens.

Example Schemes, Techniques, and Hardware for Peripheral Device Comportability with Security Circuitry The security circuitry 106 (e.g., of FIGS. 1 and 2) can include comportable circuit components, including the peripheral devices 250. This document describes example approaches to making peripheral devices comportable. Each peripheral device 250 can adhere to comportability specifications for the security circuitry 106. By adhering to a comportability specification that defines at least one interface scheme or communication protocol, a peripheral device 250 is realized with at least one interface that produces consistent and expected interactions between the peripheral device 250 and other peripheral devices. This produces increased communication predictability and certainty and decreases the time involved to design and test security circuitry.

Figure 3:
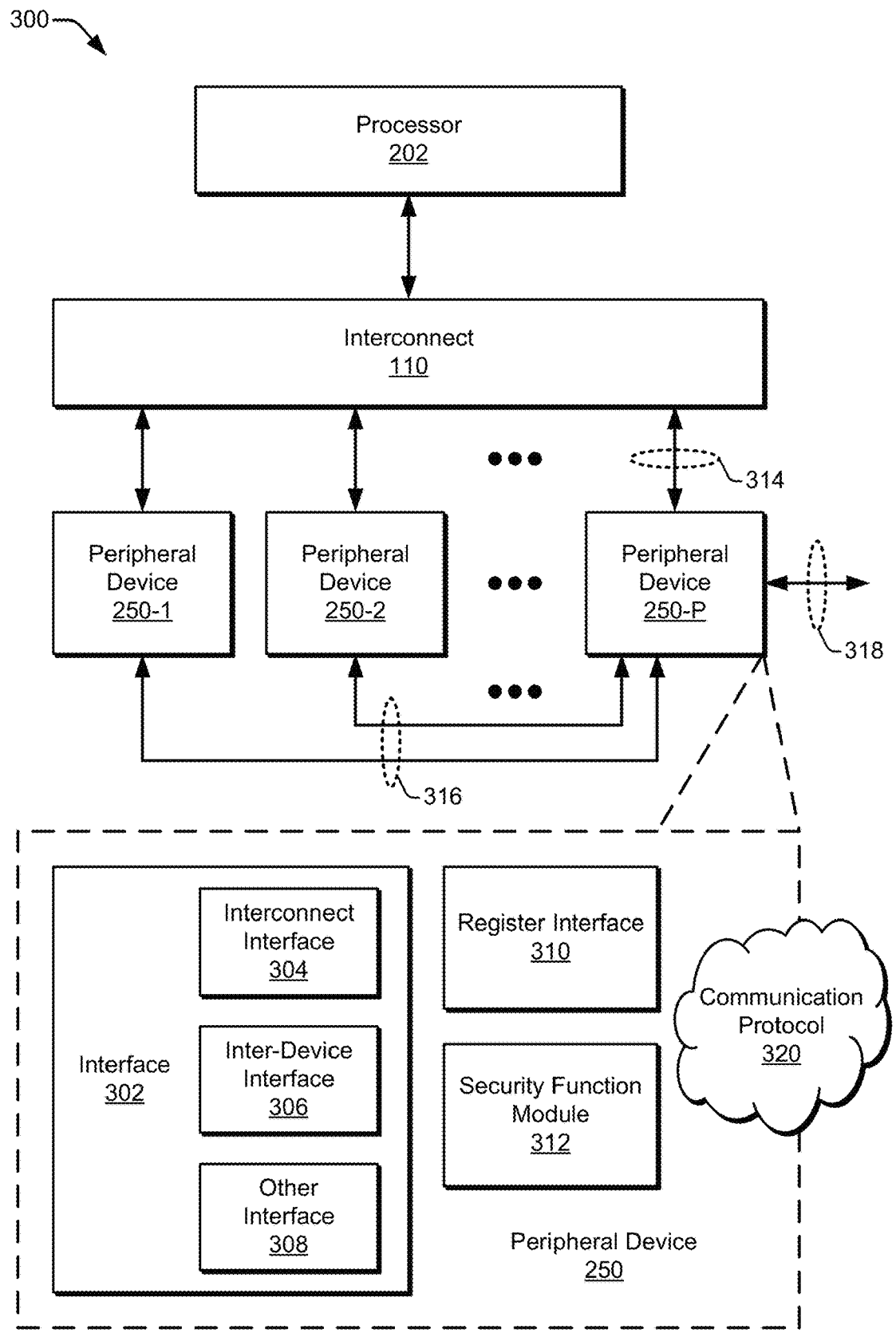
FIG. 3 illustrates an example peripheral device including at least one interface to support comportability with other circuit components.

FIG. 3 illustrates at 300 an example peripheral device 250 including at least one interface 302 to support comportability with other circuit components. More generally, FIG. 3 includes an interconnect 110, a processor 202 coupled to the interconnect 110, and multiple peripheral devices coupled to the interconnect 110. Thus, the multiple peripheral devices can at least be coupled to the processor 202 via the interconnect 110. Each peripheral device 250 may, however, also be coupled to the processor 202 directly or otherwise without using the interconnect 110. FIG. 3 explicitly depicts P peripheral devices 250-1, 250-2, . . . , 250-P, with P representing a positive integer.

In example implementations, each peripheral device 250 includes at least one interface 302 that enables the peripheral device 250 to adhere to a communication framework that provides certainty for interoperating peripheral devices. For example, the interface 302, or communication interface 302, can enable the peripheral device 250 to implement at least one communication protocol 320. The interface 302 includes at least one interconnect interface 304, at least one inter-device interface 306, and at least one other interface 308. These interfaces are described below. As shown, the peripheral device 250 also includes at least one register interface 310 and at least one security function module 312. Generally, the interface 302 enables the peripheral device 250 to adhere to a common framework for interacting with the processor 202 and with other peripheral devices of the multiple peripheral devices 250-1 . . . 250-P.

The register interface 310 includes one or more registers or register entries. Each register entry can be used, for example, for communication to or from (e.g., for communication into or out of) the peripheral device 250. For example, the processor 202 or another peripheral device can set or clear a register entry or can load a register entry with a value to communicate with the peripheral device 250. Conversely, the peripheral device 250 may change a value of a register entry to communicate with the processor 202 or another peripheral device. To enable this communication, the peripheral device 250 can expose at least part of the register interface 310 to the processor 202 or another peripheral device. For instance, the peripheral device 250 can provide the processor access to clear an interrupt state indication, as is described below with reference to FIGS. 5-2 to 5-4.

Generally, the register block can be used to communicate with the remainder of the peripheral logic to manage configuration and status communication, e.g., with software. In some cases, the register interface 310 can be implemented using control and status registers (CSRs). The CSRs provide a collection of registers within a peripheral device 250, the registers of which are addressable at least by the local host processor 202 via a circuit-wide, or chip-wide, address map. The CSRs can be standardized to enhance software uniformity and to facilitate circuit reuse and documentation consistency. Example aspects of the register interface 310 are described below with reference to FIGS. 5-1 and 5-2.

The security function module 312 implements a security-related function of the peripheral device 250. Security-related functions include core or primary security functions and supporting or secondary security functions. Core security functions include, for example, alert handling, cryptographic operations including encrypting and decrypting, random-number generation, secure data storage including storing and accessing secret data (e.g., key management), and so forth. Supporting security functions include those that enable or facilitate performance of the core functions. Examples of supporting security functions include memory storage, memory control, timing, circuit and chip I/O control, environmental sensors, bus hosting, and so forth.

The interface 302 generally, or any of the specific example interfaces (e.g., the interconnect interface 304, the inter-device interface 306, or the other interface 308), can establish at least one register for the register interface 310 to enable a respective interface communication capability or feature. Regarding the interconnect interface 304, the interconnect interface 304 implements a communication interface that couples to the interconnect 110 to enable, for example, a connection between the peripheral device 250 and the processor 202 that adheres to a common framework. With the peripheral device 250 and the processor 202 comporting with the same common framework, device-processor communications in both directions can be standardized and predictable. The interconnect interface 304 can operate across the interconnect 110, can use at least one register of the register interface 310, can use a separate bus or independent wires, some combination thereof, and so forth. In operation, the peripheral device 250 can use the interconnect interface 304 to engage in at least one interconnect communication 314. Additionally or alternatively, the peripheral device 250 may use the interconnect interface 304 to communicate with another peripheral device via the interconnect 110.

The inter-device interface 306 implements a communication interface between the peripheral device 250 and one or more other peripheral devices that adhere to a common framework. With the peripheral device 250 and each other peripheral device comporting with the same common framework, device-device communications in both directions can be standardized and predictable. The inter-device interface 306 can use at least one register of the register interface 310, can use a bus dedicated to the peripheral devices, can use one or more independent wires extending between two peripheral devices, some combination thereof, and so forth.

In operation, the peripheral device 250 can use the inter-device interface 306 to engage in at least one inter-device communication 316. By bypassing the interconnect 110 to communicate with another peripheral device, the peripheral device 250 can communicate "directly" with the other peripheral device in some implementations. Further, by establishing and adhering to an inter-device communication scheme, consistency and certainty are promoted for communications between two or more devices. Accordingly, designers can focus on achieving the intended security-related function of the security function module 312 instead of expending time and resources tracking and double-checking numerous ad hoc communication regimes.

The other interface 308 implements a communication interface between the peripheral device 250 and another circuit component that adheres to a common framework. With the peripheral device 250 and the other circuit component comporting with the same common framework, peripheral device signaling in both directions can be standardized and predictable. An example of the other interface 308 is a chip I/O interface for communicating information externally. Another example of the other interface 308 is an interrupt interface, if interrupts are not communicated fully via the interconnect 110. Yet another example of the other interface 308 is a clock interface. In some cases, the security circuitry 106 (not separately indicated in FIG. 3) includes a primary system clock and one or more secondary system clocks. A clock interface can utilize the primary system clock and at least a selected portion of the secondary system clocks for communication timing and general functionality. The clock interface can operate in accordance with a clock scheme for the security circuitry 106, and design code for the peripheral device 250 can specify the clocks that are relevant to the peripheral device 250. In operation, the peripheral device 250 can use the other interface 308 to engage in at least one other communication 318 with another circuit component, like I/O circuitry or a clock tree.

Figure 4:
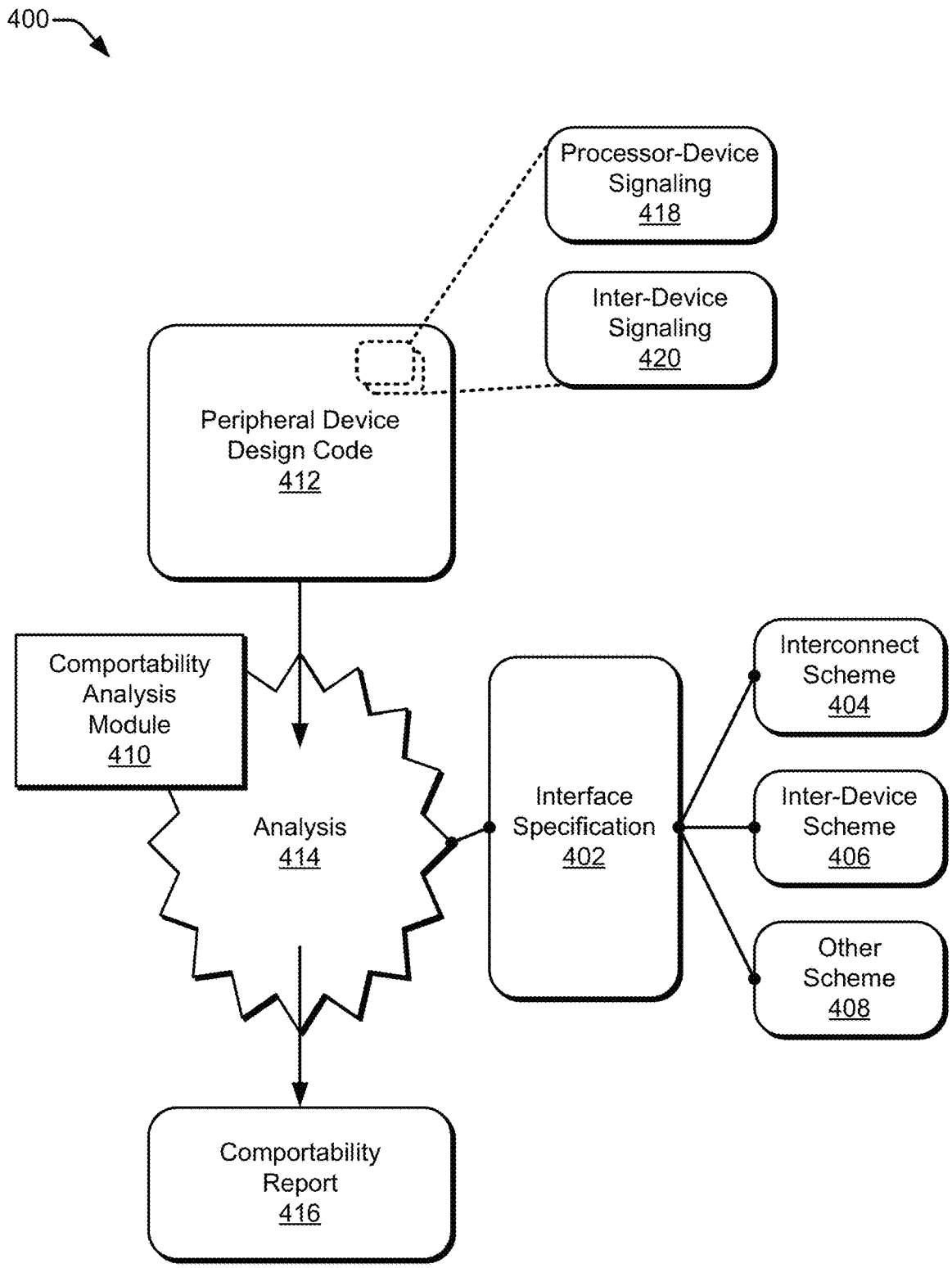
FIG. 4 illustrates an example approach to analyzing a peripheral device design to ensure comportable objectives are satisfied.

FIG. 4 illustrates an example approach 400 to analyzing a peripheral device design to ensure comportable objectives are satisfied. In example implementations, the approach 400 uses an interface specification 402 that can include an interconnect scheme 404, an inter-device scheme 406, or another scheme 408 (including each of the schemes). The interface specification 402 corresponds to the interface 302 (of FIG. 3). The interconnect scheme 404 corresponds to the interconnect interface 304, the inter-device scheme 406 corresponds to the inter-device interface 306, and the other scheme 408 corresponds to the other interface 308. These schemes can additionally or alternatively include a local or chip-level I/O scheme, an interrupt scheme, a clock scheme, and so forth.

Accordingly, the interface specification 402 can establish the rules, protocols, attributes, options, capabilities, etc. for the interface 302. Similarly, each of the interconnect scheme 404, the inter-device scheme 406, and the other scheme 408 can respectively establish the rules, protocols, attributes, options, capabilities, etc. for the interconnect interface 304, the inter-device interface 306, and the other interface 308. During design time, the designer develops each peripheral device 250 to adhere to each relevant scheme of the interface specification 402. For instance, the inter-device scheme 406 may establish a format for defining inter-device signaling that bypasses the interconnect 110 of the security circuitry 106. By doing so, a comportable peripheral device 250 can be produced that enhances interoperability and reduces design and development time, as well as testing and debugging efforts. For example, a peripheral device 250 can communicate a signal (e.g., an inter-device signal) to another peripheral device using circuitry derived from an attribute specified by the design code for the peripheral device.

In example approaches, a comportability analysis module 410 can perform an analysis 414 of design code to check for comportability. A designer produces a peripheral device design code 412 with reference to the interface specification 402. Thus, the peripheral device design code 412 meets comportability objectives by adhering to the interface specification 402. The peripheral device design code 412 may be realized at least partially using, for instance, a configuration file. The peripheral device design code 412 can include one or more indications of processor-device signaling 418 (e.g., defining aspects of an interconnect communication 314 between a peripheral device 250 and a processor 202), one or more indications of inter-device signaling 420 (e.g., defining aspects of an inter-device communication 316 between a peripheral device 250 and another peripheral device), and so forth. The one or more indications of inter-device signaling 420 can relate, for instance, to signals exchanged between two or more peripheral devices, including without using the interconnect 110 of the security circuitry 106. These indications can follow the rules and guidelines for registers, signal naming, data types, timing, and so forth for these signals.

Descriptions in the peripheral device design code 412 result in circuit components in the security circuitry 106. For example, regarding an inter-device interface 306 of a respective peripheral device 250 (e.g., of FIG. 3), based on an attribute included in the design code 412 therefor, the inter-device interface 306 can be coupled to at least one wire that extends to another peripheral device to enable inter-device signaling. By specifying inter-device signaling 420 in the design code 412, interoperability and communication certainty are increased. The interface specification 402 or the configuration file of the design code 412 can indicate the peripheral features that are mandatory and those that are optional in a given comportability framework. Thus, compliant design code may include a mandatory portion and an optional portion in some situations. Generally, the design code 412 can be formatted in accordance with any IC design or configuration platform. Examples include Verilog, Python, Hjson, and so forth. An example configuration file format is set forth below.

In operation, the comportability analysis module 410 accepts the peripheral device design code 412. With reference to the interface specification 402, the comportability analysis module 410 performs an analysis 414 to check whether the peripheral device design code 412 is compliant with the specified common framework. The comportability analysis module 410 can compare the peripheral device design code 412 to one or more of the interconnect scheme 404, the inter-device scheme 406, or the other scheme 408 to check whether the code meets the specifications of each. Any of these schemes may include specifications relating to interrupts, register usage, and so forth. Based on the analysis 414, the comportability analysis module 410 produces a comportability report 416.

The comportability report 416 indicates whether the peripheral device design code 412 passes the analysis 414 by meeting the criteria of the interface specification 402. If not, the comportability analysis module 410 can include a list of "infractions" in the comportability report 416. Each infraction can include a reference to the code portion that is causing a failure indication or a reference to the part of the interface specification 402 that is being violated. Although the interface specification 402, the comportability analysis module 410, and the peripheral device design code 412 may be described with regard to an example security circuitry environment, the interface specification 402, the comportability analysis module 410, or the peripheral device design code 412 may be implemented in other environments. Accordingly, a comportability report 416 may cover an analysis of general circuit designs.

Figures 1, 5:
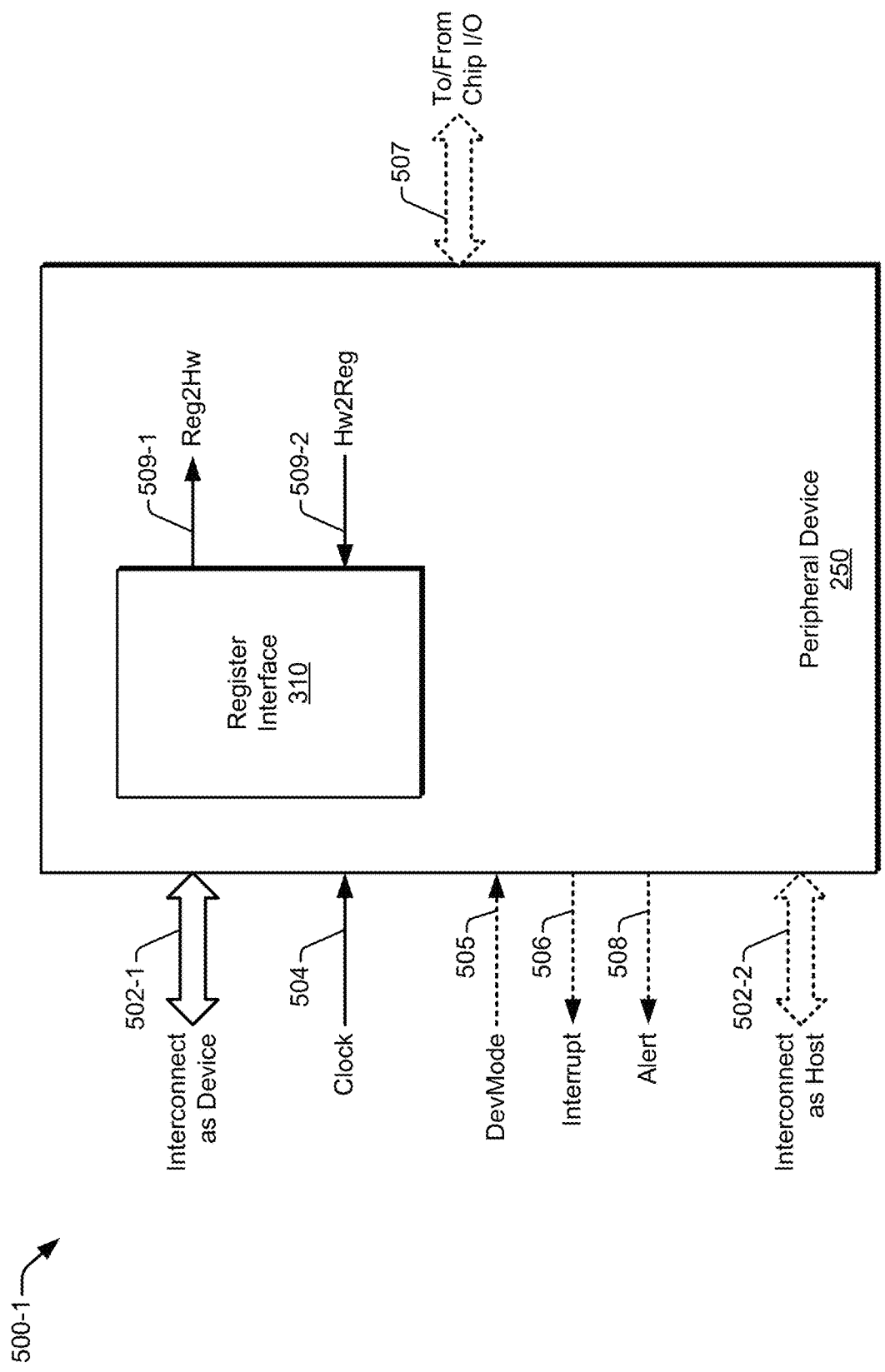
Figures 2, 5:
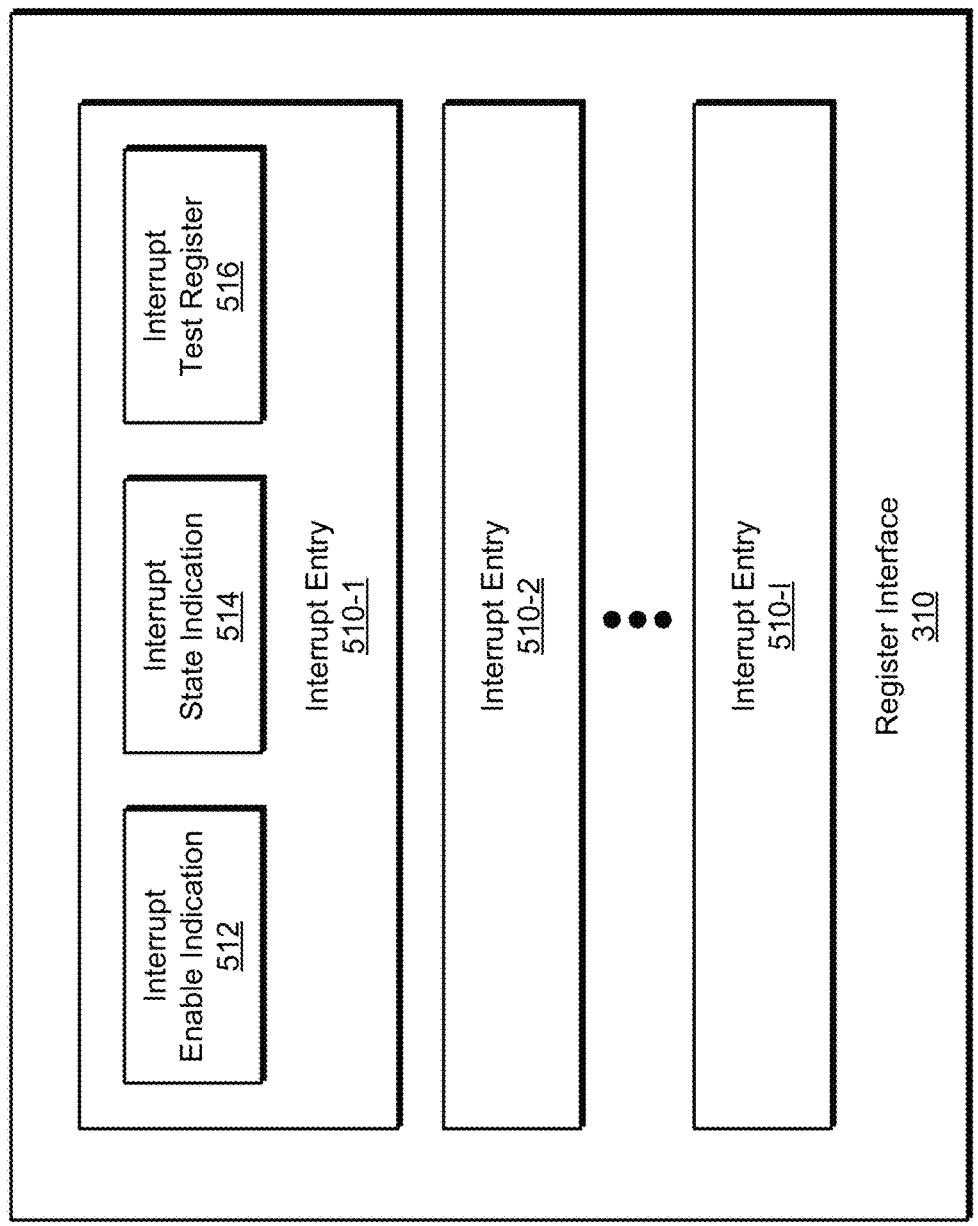
Figures 3, 5:
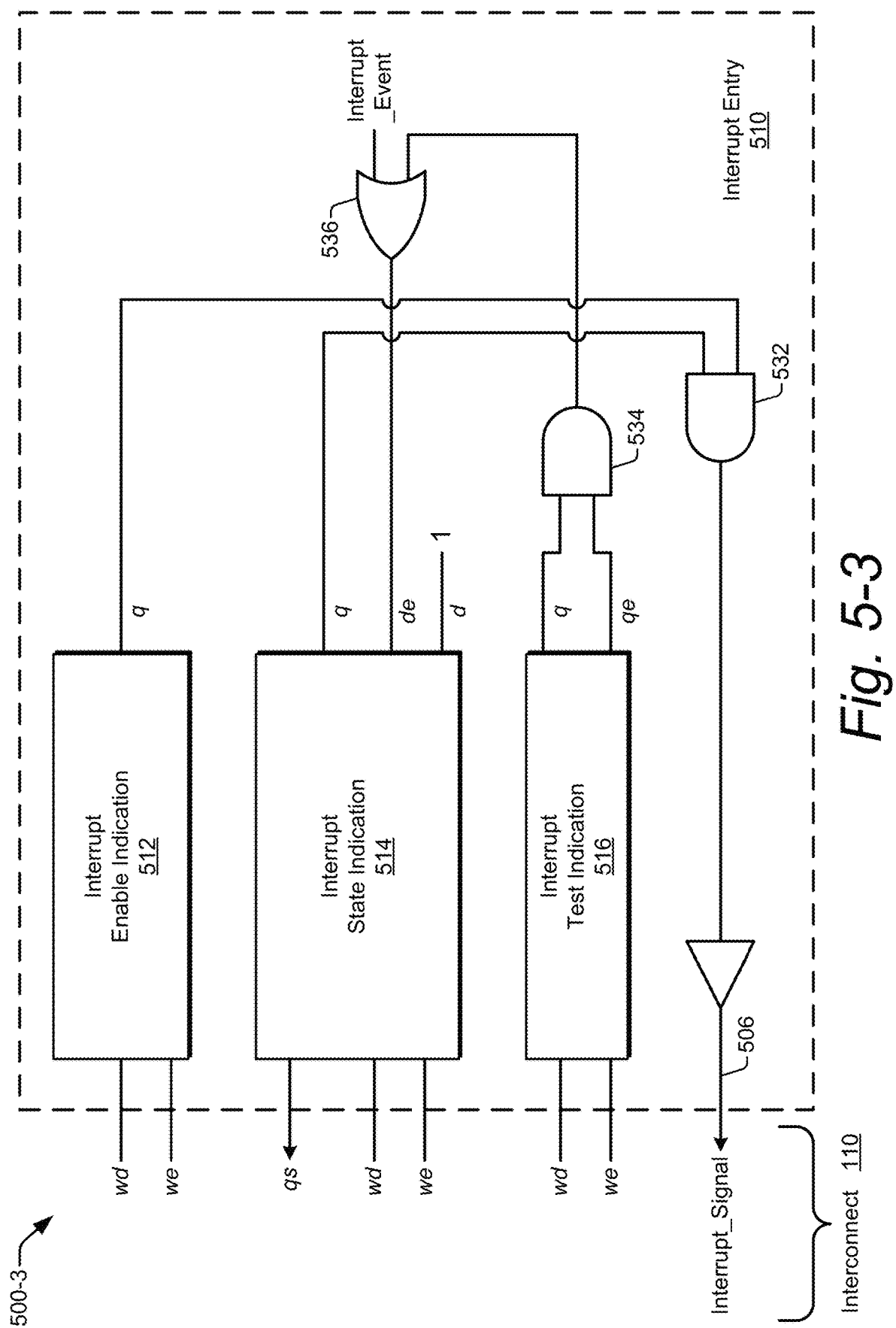
Figures 4, 5:
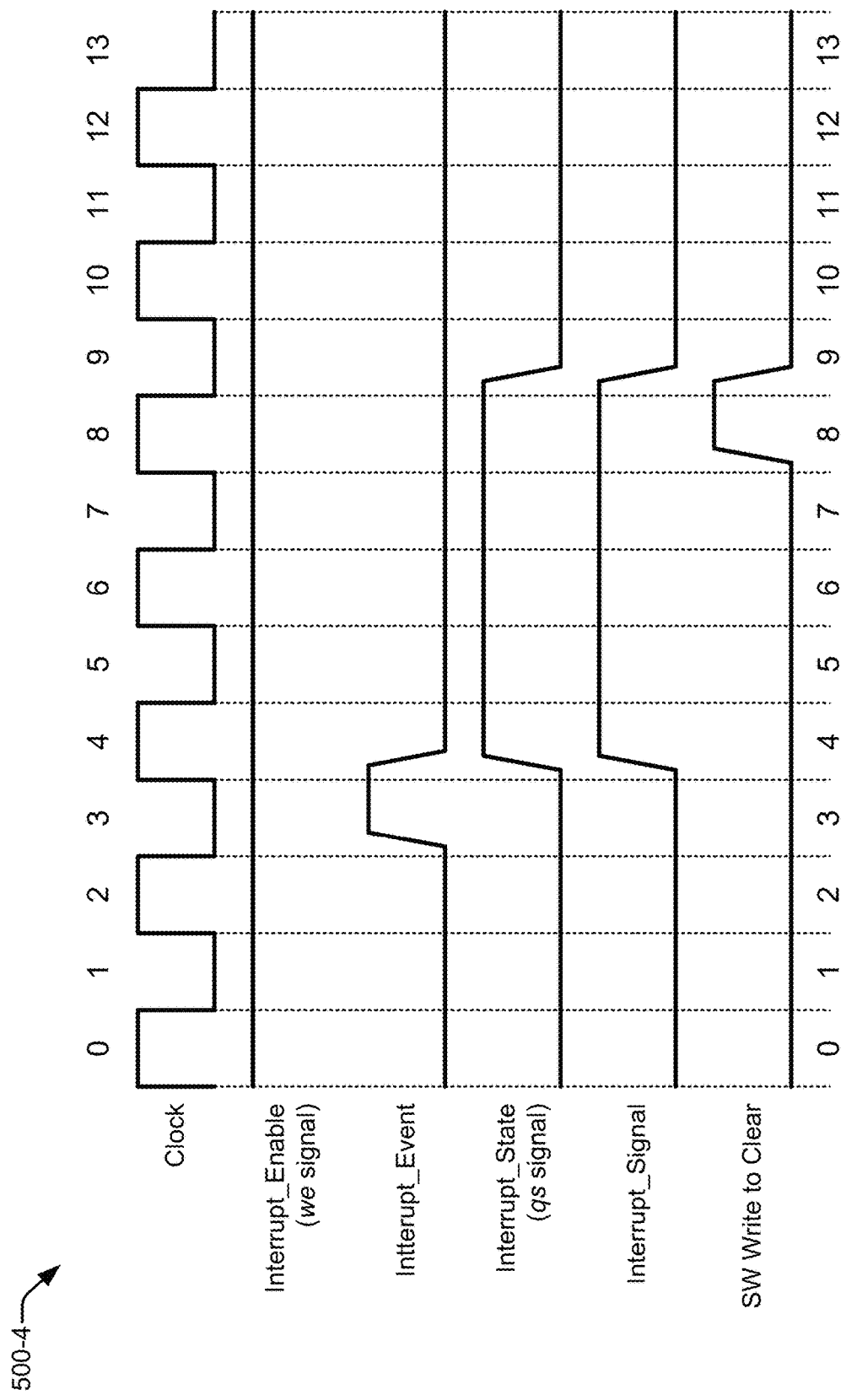

FIG. 5-1 illustrates at 500-1 an example peripheral device 250 including a register interface 310 and example communication signals. In FIG. 5-1 generally, but by way of example only, communication channels or signals that are mandatory are depicted with solid lines, and communication channels or signals that are optional are depicted with dashed lines. In other instances, however, different channels or signals may be mandatory or optional. Further, lines in other figures that are solid or dashed are not necessarily indicative of a requirement or a lack of a requirement, respectively, under a given interface specification.

In example implementations, various signals can be specified as part of a framework for comportability to which the peripheral device 250 is to adhere. Starting with the top left, a bidirectional signaling 502-1 using the interconnect 110 is depicted with the peripheral device 250 functioning as a device (e.g., functioning as a follower) relative to the interconnect 110. Below that, the peripheral device 250 is shown as receiving at least one clock signal 504 and at least one development mode signal 505. The development mode signal 505 represents an indication to the peripheral device 250 of what mode the security circuitry 106 or an overall SOC is currently operating in. In other words, there can be multiple modes of operation. With two example modes, the multiple modes can include a development mode and a production mode. The mode indication may determine, for instance, how software errors are handled. Other modes may enable a security feature that conveys the full life cycle mode status to the peripheral device.

The peripheral device 250 can also generate or output at least one interrupt signal 506 or at least one alert signal 508. Further, a bidirectional signaling 502-2 using the interconnect 110 is depicted with the peripheral device 250 functioning as a host (e.g., functioning as a leader) relative to the interconnect 110. The peripheral device 250 can further engage in bidirectional signaling 507 with the GPIO interface 220 or other chip I/O circuitry. Regarding the register interface 310, at least one outgoing signal 509-1 is labeled as a register-to-hardware (Reg2Hw) signal. At least one incoming signal 509-2, on the other hand, is labeled as a hardware-to-register (Hw2Reg) signal. These signals that are depicted in FIG. 5-1 are described further below. Examples of the incoming and outgoing register signals are described below with reference to FIG. 5-3 in an interrupt context. Prior to describing interrupt register signals, however, example interrupt register entries are described with reference to FIG. 5-2.

Generally, in some implementations, certain features are deemed mandatory, while other features are considered optional. These mandatory and optional categories may, however, vary between different implementations. With a comportable design, these two categories can be assigned per-feature so that each peripheral device 250 interoperates with other peripheral devices appropriately. An example assignment between mandatory and optional categories is set forth next. First, a clocking specification is mandatory.

Each peripheral device specifies its primary functional clock and any other clocks to be used. The primary clock is the one driving the interconnect over which the peripheral is communicating. The clocking section also lists the available clocks. Other clocks can be designated if they are expected to be used. Second, a bus device (or follower) interface is mandatory. Each peripheral device 250 can include one or more registers; thus, each such peripheral device 250 is configured to be a device on a chip bus or other interconnect 110. Third, one or more registers are mandatory. Accordingly, each peripheral device 250 defines a collection of registers in a specified register format. Based on the design code for the peripheral device 250, the registers can be automatically generated by instantiating the associated hardware. Corresponding software or explanatory documentation can likewise be created.

Fourth, a bus host (or leader) interface is optional. If included, the peripheral device 250 can act as a bus host on some occasions, even if overall chip simplicity may be increased by making the processor be the primary host. By way of example, a direct memory access unit (DMA unit) type of peripheral device 250 may instantiate a bust host interface. Fifth, a specification of available I/O is optional. If a peripheral device 250 is to make connections to dedicated or multiplexed I/O pins, the peripheral device 250 can indicate its peripheral inputs and outputs that are available for chip I/O. Sixth, interrupts are optional. Peripheral devices can generate signals that are used to interrupt the primary processor. These interrupts are designated with a list of corresponding signals. Each designated interrupt results in a single wire or a bundled output that is sent to the processor 202 to be gathered as part of its interrupt vector input. Seventh, alerts are also optional. Peripheral devices can generate signals that indicate a potential security threat. These alerts are also designated with a list of signals. Each designated alert results in a complementary signal pair that is sent to the alert handler 204. Eighth, inter-device signals are optional. Peripheral devices can specify separate signals that connect from/to other peripheral devices, which are called inter-device signals herein. In other implementations, different features may be designated as mandatory or optional in various manners. In still other implementations, features may not be designated as mandatory versus optional, or they may be designated using different categories.

FIG. 5-2 illustrates at 500-2 an example register interface 310 with multiple interrupt entries. Generally, the register interface 310 includes multiple register entries. As shown for interrupt-related aspects, the register interface 310 includes multiple interrupt entries 510-1, 510-2, . . . , 510-I, with I representing a positive integer. The quantity I of multiple interrupt entries 510-1 . . . 510-1 may vary for each peripheral device 250 and from design to design.

In example implementations, each interrupt entry 510 includes three indication(s) or register(s): an interrupt enable indication 512, an interrupt state indication 514, and an interrupt test register 516. Each indication has at least one bit. By way of example, if each indication is one bit and the register interface 310 includes 16 interrupt entries 510-1 . . . 510-I (e.g., I=16), then the register interface 310 includes 48 bits (3×16=48) to process the interrupts for this peripheral device 250. The register interface 310 may include other entries.

In operation, the interrupt enable indication 512 establishes whether the corresponding interrupt is activated for use or not. In some cases, the processor 202 can set the enablement indication; in other cases, the peripheral device 250 or both may set the enablement indication. The interrupt state indication 514 is active if the interrupt is triggered and inactive if the interrupt is cleared. The processor 202 can test the interrupt using the interrupt test register 516; for example, the processor 202 can trigger the register to trigger an interrupt for testing purposes. These indications are described further with reference to the interrupt hardware of FIG. 5-2 and the interrupt signaling of FIG. 5-3.

FIG. 5-3 illustrates at 500-3 an example interrupt entry 510 (or interrupt register 510). The interrupt entry 510 includes an interrupt enable indication 512, an interrupt state indication 514, and an interrupt test register 516. The signaling on the left (as depicted) of the interrupt entry 510 represents signals that can be communicated over the interconnect 110, for instance. Each of the indication(s) or register(s) 512, 514, and 516 receive two signals wd and we from, e.g., the processor 202. The we signal represents write enable, and the wd signal represents write data. The processor 202 can read a current state or condition of the interrupt state indication 514 as represented by the qs signal. The peripheral device 250 (e.g., of FIG. 5-1) can tie the d input of the interrupt state indication 514 to a "1" (e.g., high) or active voltage level.

For a testing mode, the processor 202 drives both the wd and we signals active into the interrupt test register 516 to trigger an interrupt test. The interrupt test register 516 outputs these two active signals as the q and qe signals, which are coupled to two inputs of an AND gate 534. With both signals active, the AND gate 534 provides an active value to a lower input of an OR gate 536. Based on at least one signal being active, the OR gate 536 drives the de input of the interrupt state indication 514 active. This renders the current state of the interrupt state indication 514 as set. The processor 202 has access to this state via the qs signal.

For a regular or operational mode, the peripheral device 250 detects an event corresponding to an interrupt and drives the interrupt event signal (Interrupt_Event) high at the upper input of the OR gate 536. Based on at least one signal being active, the OR gate 536 drives the de input of the interrupt state indication 514 active. This renders the current state of the interrupt state indication 514 as set. This set state percolates through the circuitry (not explicitly shown) of the interrupt state indication 514 and is output as an active q signal of the interrupt state indication 514. This active state signal is coupled to an upper input of an AND gate 532.

Meanwhile, the processor 202 may also drive both the wd and we signals active into the interrupt enable indication 512. If so, then the interrupt enable indication 512 drives the output q signal thereof active. This active signal is propagated to an upper input of the AND gate 532. With both inputs of the AND gate 532 active, the AND gate 532 drives an output of the interrupt entry 510 active. Thus, the peripheral device 250 drives the interrupt signal 506 (Interrupt_Signal) active responsive to detection of the interrupt event. This active interrupt signal 506 is routed or coupled to the interrupt-handling hardware of the processor 202.

Although particular gates and certain signaling relationships are described above for the example interrupt entry 510, an interrupt entry 510 (or another register entry of a register interface 310) may be implemented in alternative manners. For example, the peripheral device 250 may control the register enablement. Additionally, a wd signal may have multiple bits. Further, the signaling to and from the peripheral device 250 may be made with another peripheral device 250, either via the interconnect 110 or through another (e.g., direct, exclusive, or peripheral-device-only) signaling pathway.

FIG. 5-4 illustrates an example timing diagram 500-4 for handling interrupts between a peripheral device 250 and a processor 202. The timing diagram 500-4 includes a clock signal (Clock) across 14 cycles or half clock cycles extending from timeslots 0 to 13. With reference also to FIG. 5-3, the interrupt enable signal (Interrupt_Enable (we signal into interrupt enable indication 512)) is active high throughout the timeslots 0 to 13. Around timeslot 2 or 3, the peripheral device 250 detects an event that triggers an interrupt. The peripheral device 250 drives the interrupt event signal (Interrupt_Event) active at timeslot 3.

Within, e.g., one timeslot, the interrupt state (Interrupt_State) of the interrupt state indication 514 becomes active. As shown, this signal goes high during timeslot 4, and the value can be read by the processor 202 (as the qs signal). Assuming that the interrupt enable indication 512 is also active, the AND gate 532 (of FIG. 5-3) drives the interrupt signal 506 (Interrupt_Signal) active high during the same timeslot 4. Responsive to the active interrupt signal, software operating on the processor 202 addresses the interrupt over some number of timeslot(s). After the interrupt is handled, the software can clear the interrupt state in the interrupt state indication 514. The timing diagram 500-4 depicts software clearing the interrupt with a signal (SW Write to Clear) during timeslot 8. Consequently, the interrupt state, the interrupt signal, and the interrupt-clearing signal become inactive low during timeslot 9.

Various example implementations for different peripheral device features are described next. First, multiple features are briefly described at relatively higher levels. These features include clocking, reset, bus device interfacing, bus host interfacing, I/O pathways, I/O multiplexing, interrupts, alerts, and inter-device signaling. Second, after presenting an example configuration file and corresponding documentation, several features are described at relatively lower levels and in greater detail. These features include configuration descriptions (or peripheral device coding), interrupt handling, alert handling, and inter-device signal handling. The various examples, if implemented, may be implemented separately, jointly, in whole or in part, and so forth. The various examples may further be modified in diverse manners.

Regarding clocking, each peripheral device defines at least one clock: the primary clock. This is defined as "clock_primary" in the configuration file and is set to one of the known clock names. This primary clock is defined as the one used to clock the bus device, indicating to the top level if asynchronous handling of the bus interface is to be used. The peripheral device can also request other clocks for internal use. These create asynchronous clock domains within the peripheral device that are handled by the common framework. The other clocks are defined under "other_clock_list" in the configuration file.

Regarding resets, peripheral device coding may specify a reset scheme. Alternatively, no additional information may be provided to indicate the reset scheme for a given peripheral device. Instead, a default condition may be enacted whereby each clock comes with its related reset pins targeted for that clock domain. In some cases, resets within the design are configured as asynchronous active low. If so, special care is applied for security-sensitive storage elements. With asynchronous active low resets, the assertion of the reset is asynchronous to any clock. De-assertion, however, is synchronized to the clock of the associated storage element. Security storage elements can "leak" sensitive state content, so the storage elements should be handled carefully regardless of reset methodology. In this context, "careful handling" can involve resetting their values synchronously—at some time after a chip-wide reset—to a value that is randomized so that the Hamming distance between the register value and all zeros cannot produce information valuable to an attacker. Asynchronous active low may demand slightly more area and more planning to implement, but it is more common and therefore more widely known to many designers as compared to synchronous active high. On the other hand, synchronous active high is slightly more efficient, but it involves using a clock edge to take effect.

Regarding a bus device interface (e.g., to be a bus follower), each peripheral device specifies a type of bus operation using a "bus_device" keyword. For example, peripheral device code can specify TileLink-Uncached-Lite (TL-UL) as its interface to the interconnect 110 or to a chip-wide framework. In some cases, the address map for peripheral devices is not determined by the peripheral device itself or its configuration file. Instead, a higher level full-chip configuration file can distribute address ranges to each of the included bus peripheral devices.

Regarding a bus host interface (e.g., to be a bus leader), each peripheral device has the option of declaring itself a bus host, at least temporarily or on-demand. This ability is included in the configuration file with the "bus host" keyword. If a peripheral device is not to have this feature, the configuration file can indicate as much (e.g., via an empty string). If a peripheral device is to have this feature, a bus host protocol name is included with the keyword. To foster comportability, each bus host may use the same clock as the defined primary host clock. In some cases, each bus host is provided a host identifier or identification (ID) (e.g., four bits) to distinguish hosts within the system. This is enforced by the framework in order to ensure uniqueness of each host.

Regarding I/O availability, each peripheral device can designate signals (e.g., inputs, outputs, or inouts) that are available to be used for chip I/O. The framework determines for each signal if the signal is routed directly to a dedicated chip pin or is multiplexed with signal(s) from other peripherals before reaching a chip pin. Designation of available I/O for each peripheral device can be given with the configuration file entries of "available_input_list," "available_output_list," and "available_inout_list." However, any of these entries can be skipped or can contain an empty list "[ ]." If not empty, then any of these file entries can include a comma-separated list of signal names. In some cases, items on the input list of the form "name" incur a peripheral input of the form "cio_name_i." Items on the output list of the form "name" incur a peripheral output of the form "cio_name_o" as well as an output enable "cio_name_en_o." Items on the inout list of the form "name" incur all three.

Regarding multiplexing chip I/O and pad control, in the top-level chip framework, a pin multiplexing unit (pinmux) can be instantiated. The pin multiplexing unit provides flexible assignment to/from peripheral I/O and chip pin I/O. Comportable peripheral devices need not designate whether their available I/O are hardwired to a chip I/O or available for multiplexing. Instead, this specification is accomplished at a higher level with a configuration file (e.g., a Hjson config file). Additionally, full pad control is not performed by the peripheral logic, for a pad controller device performs this function. The pad controller device can provide software configuration control over pad drive strength, pin mapping, pad type (e.g., push/pull, open drain, etc.), and so forth.

Regarding interrupts, each peripheral device may designate one or more output signals as interrupts destined for the local host processor. These interrupt signals are non-security-critical signals (e.g., relative to alerts) and are sent to the processor to handle using its interrupt service routines. The peripheral device design code lists its collection of interrupts with the "interrupt_list" attribute in the configuration file. Each item of the form "name" in the interrupt list expects a module output named "intr_name_o."

Regarding alerts, each peripheral device may designate one or more output signals as security-critical alerts destined for the hardware alert handler device. These alert signals are implemented as differential signals to avoid creating a single point of failure. Peripheral devices transmit alert signals to the alert handler to send to the processor for first-line defense handling. Should the processor fail to resolve the alert, the alert handler provides a hardware security response. The peripheral device design code lists its collection of alerts with the "alert_list" attribute in the configuration file. For each alert in the security circuitry, a corresponding set of signals is generated in the alert handler to carry out the communication between an alert sender of a given peripheral device and the alert handler device. Example communication signaling to accommodate alerts is described below with reference to FIG. 6, and example communication signaling to handle escalated alerts is described below with reference to FIG. 7.

Regarding inter-device signaling, peripheral devices can produce, transmit, receive, or process signals exchanged between at least two peripheral devices. These inter-device signals can extend beyond interrupts and alerts. A peripheral device design code lists its collection of inter-device signals with the "inter_signal_list" attribute in the configuration file. The peripheral device can define a type of each specified inter-device signal. The logical or physical connection between two or more peripheral devices can be defined in the higher-level (e.g., a top-level) configuration file.

At least part of the peripheral device design code 412 can be realized as a configuration description. In some implementations, a configuration file is prepared with or complies with Hjson. The configuration file can describe the peripheral device 250, including registers of the register interface 310. An example configuration file is presented below. This example includes both mandatory and optional categories, as indicated in the comments; nonetheless, other implementations may have one or the other category (but not both) or neither category. In this example, the name of the peripheral device 250 is "uart." The other configuration fields, however, are provided by way of explanation and are not necessarily coincident with the functionality of a UART peripheral device. In other words, some of the configuration fields are shown for edification purposes in the example configuration file below.

```
{
  name: "uart",
  clock_primary: "clk_fixed",           // optional; default "clk"
  other_clock_list: [ "clk", "clk_lowpower" ],// optional; default [ ]
  bus_device: "tlul",
  bus_host: "",                          // optional; default undefined
  available_input_list:                  // optional; default [ ]
    { name: "rx", desc: "Receive bit" }
  ],
  available_output_list: [               // optional; default [ ]
    { name: "tx", desc: "Transmit bit" }
  ],
  available_inout_list: [ ],             // optional; default [ ]
  interrupt_list: [                      // optional; default [ ]
    { name: "tx_watermark", desc: "raised if the transmit FIFO..."}
    { name: "rx_watermark", desc: "raised if the receive FIFO..."}
    { name: "tx_overflow", desc: "raised if the transmit FIFO..."}
    { name: "rx_overflow", desc: "raised if the receive FIFO..."}
```

-continued

```
    { name: "rx_frame_err", desc: "raised if a framing error..."}
    { name: "rx_break_err", desc: "raised if break condition..."}
    { name: "rx_timeout", desc: "raised if the receiver..."}
    { name: "rx_parity_err", desc: "raised if the receiver..."}
  ],
  alert_list: [                          // optional; default [ ]
    { name: "uart_breach", desc: "Someone has attacked the ..."}
    { name: "uart_frozen", desc: "The UART lines are frozen..."}
  ],
  inter_signal_list: [
    { name: "msg_fifo",
      struct: "fifo",
      package: "msg_fifo_pkg",
      type: "req_rsp",
      act: "req",
      width: 1
    }
    { name: "suspend",
      struct: "logic",
      package: "",
      type: "uni",
      act: "rcv",
      width: 1
    }
  ]
  regwidth: "32",                        // standard register width
  register: [
                                          // Register information.
  ]
}
```

The example configuration file above corresponds to the example documentation format output that is presented below:

Primary Clock: clk_fixed
Other Clocks: clk, clk_lowpower
Interconnect Device Interface: tlul
Interconnect Host Interface: none
Peripheral Pins available for Chip-Level I/O:

| Pin Name | Direction | Description |
|---|---|---|
| tx | output | transmit bit |
| rx | input | receive bit |

Interrupts:

| Intrpt Name | Description |
|---|---|
| tx_watermark | Raised if the transmit FIFO is past the high-water mark |
| rx_watermark | Raised if the receive FIFO is past the high-water mark |
| tx_overflow | Raised if the transmit FIFO has overflowed |
| rx_overflow | Raised if the receive FIFO has overflowed |
| rx_frame_err | Raised if a framing error has been detected on receive |
| rx_break_err | Raised if a break condition is detected on receive |
| rx_timeout | Raised if the receiver has not received any characters (programmable time period) |
| rx_parity_err | Raised if the receiver has detected a parity error |

Security Alerts:

| Alert name | Description |
|---|---|
| uart_breach | Someone has attacked the UART device |
| uart_frozen | The UART lines are frozen and might be under attack |

Example approaches to interrupt handling are further described here. In some implementations, interrupts have common names, hardware interfaces, and software interfaces. Interrupts are latched indications of defined peripheral events that have occurred and have not yet been addressed by the local host processor. Interrupts are sent to the processor as active-high level interrupts (as opposed to edge interrupts.) The triggering events can be edge or level and active high or active low, as defined by the associated peripheral device. For instance, the GPIO device may interpret the rising or falling edge of one of its input bits as an interrupt event. The latching of the event can be performed by an auto-generated register file as described below. The clearing of the event is performed by a processor write responsive to handling of the event being completed. An example interrupt entry 510 of a register interface 310 is also described above with reference to FIGS. 5-2 and 5-3. Example waveforms that show the timings of the event occurrence, the corresponding latching of the value for the interrupt, and the clearing of the interrupt by the processor are described above with reference to FIG. 5-4.

Regarding the interrupts of a given peripheral device, the peripheral device can generate a separate interrupt for each event but send them together as a bundle to the local processor's interrupt module. "Disambiguation," or the determination of which interrupt has woken the processor, can be performed at the processor in its interrupt handler. In an alternative model, each peripheral device sends just one interrupt at a time, and the processor can disambiguate by querying the peripheral to determine which interrupt was triggered. To define one or more interrupts, the peripheral device design code can specify them. For example, the configuration file described above specifies relevant attributes for the interrupts. Circuit generation tools can be used to produce additional design aspects based on the configuration file described in the above example.

Regarding register creation, for each peripheral device, three registers are automatically created to manage each of the interrupts for that peripheral (e.g., as defined in the "interrupt_list" portion of an Hjson file). However, alternative default register formats can be implemented instead with different register purposes or a different quantity of registers. Further, the automatic generation can be overridden. Each interrupt has one field bit for each of three registers. The three registers are the INTR_STATE register, the INTR_ENABLE register, and the INTR_TEST register that are respectively represented by the interrupt state indication 514, the interrupt enable indication 512, the interrupt test register 516 (of FIGS. 5-2 and 5-3). Interrupt registers may be placed at the top of the peripheral device's address map by an automatic generation tool.

The INTR_ENABLE register is readable and writeable by the processor (rw), with one bit per interrupt which, when true, enables the interrupt of the peripheral device to be reported to the interrupt input of the processor. The INTR_STATE register is readable by the processor, and each bit may be written with 1 to clear it (rw1c). Thus, a read of the register indicates the current state of all latched interrupts, and a write of 1 to any field clears the state of the corresponding interrupt. INTR_TEST is a write-only (wo) register that allows software to test the reporting of the interrupt by simulating a trigger of the actual interrupt event, a setting of the INTR_STATE register, and a raising of the level of the interrupt signal that is output to the processor (modulo the effect of INTR_ENABLE). The contents of the INTR_STATE register need not be affected by the enable value. Instead, the INTR_STATE register shows the raw state of the latched hardware interrupt events. The output interrupt signal sent to the processor ANDs the interrupt state with the interrupt enable register (e.g., with the AND gate 532) before sending to the processor for handling.

Regarding handling interrupts, interrupts as sent to the processor are active-high level interrupts (e.g., the interrupt signal 506 of FIG. 5-3 can be active high as shown in FIG. 5-4) having equal severity. Alternatively, interrupts can have varying severity levels. For example, higher priority interrupts can be realized as a non-maskable interrupt (NMI). With reference to FIG. 5-3, the three indications (e.g., the interrupt enable indication 512, the interrupt state indication 514, and the interrupt test register 516) can be implemented as software-facing registers. In FIG. 5-3, the interrupt_event signal is shown arriving at the interrupt entry 510 from another part of the peripheral device 250. Within the register file, the interrupt event triggers the setting of the associated bit in the INTR_STATE register to 1. Additionally, a write of 1 to the bit associated with this interrupt in the INTR_TEST register can set the corresponding INTR_STATE bit. The output of the INTR_STATE register becomes the outgoing interrupt to the processor after masking (e.g., ANDing) with the value of INTR_ENABLE.

In some cases, the handling of the ro/rw1c functionality of the INTR_STATE register allows software to control the clearing of the INTR_STATE contents. A write of 1 to the corresponding bit of INTR_STATE clears the latched value. If, however, the triggering event itself as represented by the interrupt_event signal is still active, the INTR_STATE register returns to true. In this example, the hardware does not have the ability to clear the latched interrupt state; clearing is reserved for software. The hardware can, however, be designed to enable this capability. The interrupts sent to the processor are handled by its interrupt controller. Within the interrupt controller logic, there may be another level of control for enabling, prioritizing, and enumeration of multiple interrupts.

Example approaches to alert handling are further described here. In some implementations, alerts are standardized across the peripheral devices for consistency. Unlike interrupts, there is no software component to alerts at the originating peripheral device, although there can be at the hardware alert handler. At an originating peripheral device, one or more alerts may be sent as a bundled output from the peripheral device to the alert handler. Each peripheral device can be designed to send zero or more alerts, with each alert corresponding to a distinguishable security threat. Each alert originates due to some event that is internal to the respective peripheral device, and the peripheral device can first attempt to address the detected event. After the peripheral device communicates the alert to the alert handler, the alert handler processes the alert, which processing may include escalation to an escalation handler that implements a security countermeasure.

Within a peripheral device, detected internal events are sent active high to a module within the peripheral called an alert sender module. One alert sender module is instantiated per distinct alert-event type within a given peripheral device. A designer of the peripheral device determines what are distinct alert events. Multiple alerts can be bundled together, depending upon the distinction required within the module (e.g., a high-priority threat versus a low-level threat). The alert sender module converts the alert event into a differentially encoded signal pair that is routed to the hardware of the alert handler. Example implementations of this alert signaling are described below with reference to FIG. 6. The alert handler can be automatically generated to have enough alert-receiving ports to have one port corresponding to each alert that is declared in the configuration files of the various included peripheral devices.

Example approaches to inter-device signal handling are further described here. An inter-device signal can refer to separate or bundled signals connecting peripheral device instances in the top-level design. Some peripheral devices can be stand-alone peripherals, like a GPIO or a UART peripheral. These peripheral devices report interrupts to the main processor but need not talk with other peripheral devices. In contrast, some peripheral devices and the main processor may communicate directly or indirectly with other peripheral devices. For example, the flash controller sends requests to the flash macro for read, program, and erase operations.

By specifying aspects of inter-device signals in peripheral device configuration files, consistency and interoperability are facilitated. This obviates a tedious process of manually linking and testing inter-signaling between two or more peripheral devices. With appropriate definitional coding for each peripheral device 250, a higher-level design tool can properly connect each peripheral device 250 to the intended other peripheral device(s). The example configuration file presented above specifies two cases of inter-device signals, "msg_fifo" and "suspend."

An example inter-device scheme 406 (or inter-device signaling scheme 406) is set forth below. Each aspect is described in terms of an attribute, a mandatory/optional category, and a description. In alternative implementations, these aspects can vary. For example, the mandatory and optional categories may be different or may be omitted, or another aspect may be added. These aspects may be used to provide one or more indications of inter-device signaling 420 (of FIG. 4) in a peripheral device design code 412.

First, a "name" is a mandatory attribute. The name attribute specifies the port name of the inter-device signal. If the port type is "req_rsp" (request and response), the type indicates that the peripheral has two ports: a "name_req" port and a "name_rsp" port. Each name can include a "_i" or an "_o" suffix to respectively designate "input" or "output."

Second, a "struct" attribute also has a mandatory category. The "struct" field defines the signal's data structure. The inter-device signal can generally be bundled into a "struct" packed type. This "struct" is used with a "package" attribute to define the signal. If the inter-device signal is logic type, then the "package" field can be omitted. Thus, the "package" attribute is optional.

Third, a "type" attribute is mandatory. There can be two types of inter-device signals in this example inter-device signaling scheme. A "req_rsp" type is a connection in which one peripheral device sends requests and a second peripheral device returns responses. A "uni" type connection, on the other hand, is a one-way signal. The one-way signal can be used, for instance, for broadcasting signals or for signals that do not need a response.

Fourth, an "act" attribute is also mandatory. The "act" attribute pairs with the "type" attribute. The "act" attribute specifies the input/output (I/O) of the signal in the peripheral device. The "req_rsp" type can have a "req(requester)" or a "rsp(responder)" in the "act" field. The "uni" type can have "req" or "rcv(receiver)" in the "act" field.

Fifth, a "width" is an optional attribute. If the "width" is not 1 or is undefined, the corresponding port is defined as a vector of "struct." This port can therefore be connected to multiple peripheral devices.

Figure 6:
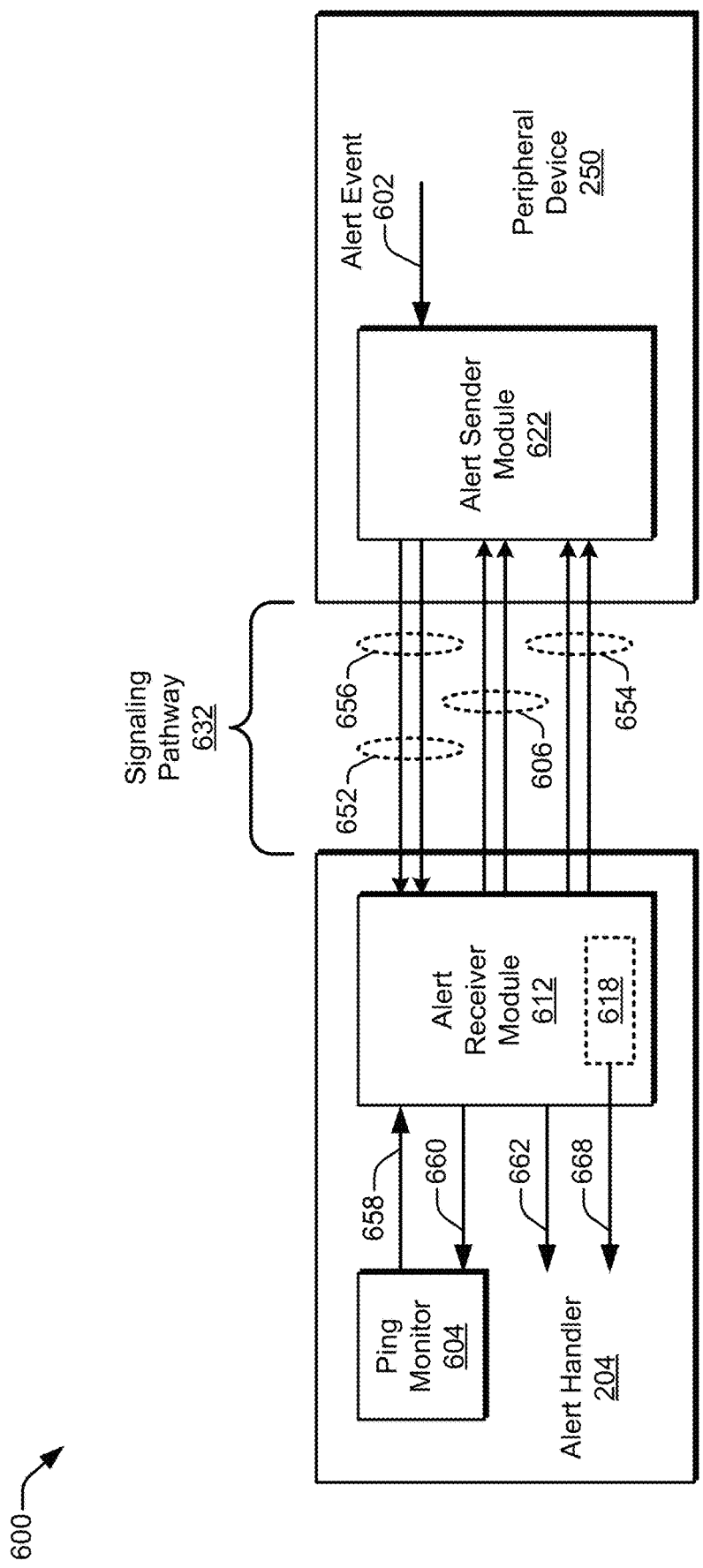
FIG. 6 illustrates an example communication relationship between an alert receiver module of an alert handler and an alert sender module of a peripheral device.

FIG. 6 illustrates an example communication relationship 600 between an alert receiver module 612 of an alert handler 204 and an alert sender module 622 of a peripheral device 250. A signaling pathway 632 includes at least one differential path. As shown, the signaling pathway 632 includes multiple pairs of wires (e.g., three pairs) to enable differential signaling across three differential paths. Each pair of wires includes a plus wire and a minus wire. The modules can communicate synchronously or asynchronously across the signaling pathway 632. The alert handler 204 also includes a ping monitor 604 to implement a pinging mechanism as a bidirectional heartbeat scheme to ensure physical and logical communication capacity.

In example implementations, the peripheral device 250 includes at least one alert sender module 622. The peripheral device 250 detects an alert event 602. The alert event 602 may correspond to a sensor input (e.g., a sensed parameter by a sensor), an observed pattern of activity, an indication received from another component, and so forth. In response to the alert event signal 602, the alert sender module 622 transmits an alert indication 652 to the alert receiver module 612 on a first pair of wires (e.g., the upper pair as depicted). Responsive to receiving the alert indication 652, the alert receiver module 612 provides a triggered alert 662 to a controller (not shown) of the alert handler 204. The alert receiver module 612 also transmits an alert acknowledgment signal 606 back to the alert sender module 622 on a second pair of wires (e.g., the middle pair as depicted) to confirm receipt of the alert indication signal 652.

For a pinging protocol, the alert receiver module 612 receives a ping instruction 658 from the ping monitor 604. Prompted by the ping instruction 658, the alert receiver module 612 transmits a ping request 654 to the alert sender module 622 on a third pair of wires (e.g., the lower pair as depicted). To indicate that the connection to the peripheral device 250 is live and functional, the alert sender module 622 transmits a ping response 656 back to the alert receiver module 612—e.g., on the first pair of wires. For resiliency, the alert sender module 622 can transmit the alert indication 652 and the ping response 656 on the same pair of wires. This ensures that a bad actor has not cut the wires for the alert indication 652 while leaving intact the wires for the ping response 656. The alert receiver module 612 receives the ping response 656 from the alert sender module 622. To complete the ping protocol loop, the alert receiver module 612 forwards a ping okay message 660 to the ping monitor 604 responsive to receipt of the ping response 656.

In some cases, at least a portion of integrity failure circuitry 618 is coupled to or incorporated into the alert receiver module 612. The integrity failure circuitry 618 monitors at least one pair of wires to determine if proper differential signaling is extant on the differential path and that expected signaling patterns match actual signaling patterns. If not, the integrity failure circuitry 618 generates an alert integrity failure signal 668 and provides this signal to the controller as an internal alert of the alert handler 204.

In some implementations, alerts are encoded differentially and signaled using a "full" handshake on the plus/minus alert indication wires (e.g., the first pair of wires) and the plus/minus alert acknowledgment wires (e.g., the second pair of wires). Employing a full handshake protocol allows the alert signaling mechanism to be used with an asynchronous clocking strategy in which some peripheral devices may reside in a different clock domain than the alert handler 204. The full handshake protocol ensures that alert messages are correctly back pressured and that no alert is "lost" at the asynchronous boundary due to (possibly variable) clock ratios greater or less than 1.0. The native alert indication can be repeated on the differential alert indication wires if the alert event 602 is still true within the peripheral device 250.

The handshake pattern can thus be repeated while the alert is true. The alert sender module 622 can wait for, e.g., two cycles between handshakes.

In an asynchronous environment, the alert indication 652 can be "immediately" propagated to the triggered alert signal 662 once the initial level change on the alert indication wires has been received and synchronized to the local clock at the alert receiver module 612. This ensures that the first occurrence of an alert indication 652 is propagated, even if the handshake lines have been manipulated to emulate backpressure. In a scenario with emulated backpressure, subsequent alert indications may be back pressured; however, the ping testing mechanism by the ping monitor 604 eventually detects that a bad actor has tampered with the wires.

In some implementations, to ensure that the alert sender modules 622 have not been compromised, the alert receiver modules 612 "ping" or line-test the senders periodically (e.g., every few microseconds) with ping or heartbeat messages. The ping monitor 604 can randomize ping timing so the appearance of ping request 654 messages cannot be predicted. The ping timing is generated by a central LFSR-based timer within the alert handler 204 (e.g., using a ping timer of the ping monitor 604) that randomly asserts the ping instruction signal 658 of a particular alert receiver module 612.

Once the ping instruction signal 658 is asserted, the alert receiver module 612 encodes a ping request message 654 as a level change on the ping requesting differential path (e.g., the third pair of wires). The alert receiver module 612 waits until the alert sender module 622 responds with a full handshake on the plus/minus alert indication wires (e.g., the first pair of wires) and the plus/minus acknowledgment wires (e.g., the second pair of wires). Once that handshake is complete, the alert receiver module 612 asserts the ping okay message 660. The LFSR-based timer can have a programmable ping timeout. After expiration of the programmable ping timer without an occurrence of a full handshake, the ping monitor 604 asserts a "ping fail" internal alert using an alert ping failure signal (not shown). That timeout can be a function of the clock ratios present in the system and can be programmed accordingly at system startup.

In the relatively unlikely case that a ping request 654 collides with a native alert indication 652 at an alert sender module 622, the alert indication 652 is held back until the ping handshake protocol is completed. Although this approach slightly delays the transmission of the alert indication 652, the alert indication 652 is eventually signaled. Further, if an alert indication 652 is sent out from the alert sender module 622 right before a ping request 654 arrives at the alert sender module 622, the alert receiver module 612 treats the alert indication 652 as a ping response. The "true" ping response is still returned just after the alert handshake is completed, so the alert is signaled with only a slight delay, and the alert receiver module 612 interprets it as such. In both collision cases, the signaling delay is on the order of the handshake length, plus the constant amount of pause cycles between handshakes (e.g., two sender cycles).

In some implementations, differential pairs are monitored for signal integrity issues by the integrity failure circuitry 618. If an encoding failure is detected, the alert receiver module 612 asserts an alert integrity failure signal 668. This can occur in at least the following failure cases: First, the alert indication differential path (e.g., the first pair of wires) may not be correctly encoded at the alert receiver module 612. This can be directly flagged as an integrity failure on the receiver side. Second, either the acknowledgment differential path (e.g., the second pair of wires) or the ping request differential path (e.g., the third pair of wires) may not be correctly encoded at the alert sender module 622. Either of these latter two failures can be detected by integrity failure circuitry (not shown) at the alert sender module 622 and signaled back to the alert receiver module 612 by having the alert sender module 622 set both the plus and minus alert indication wires to the same value. Further, the alert sender module 622 can continuously toggle that value. This implicitly triggers a signal integrity alert at the alert receiver module 612. Several signaling patterns can represent a failure. For example, if the plus and minus lines of a differential pair both have a low voltage or both have a high voltage simultaneously, then a failure is observed.

Figure 7:
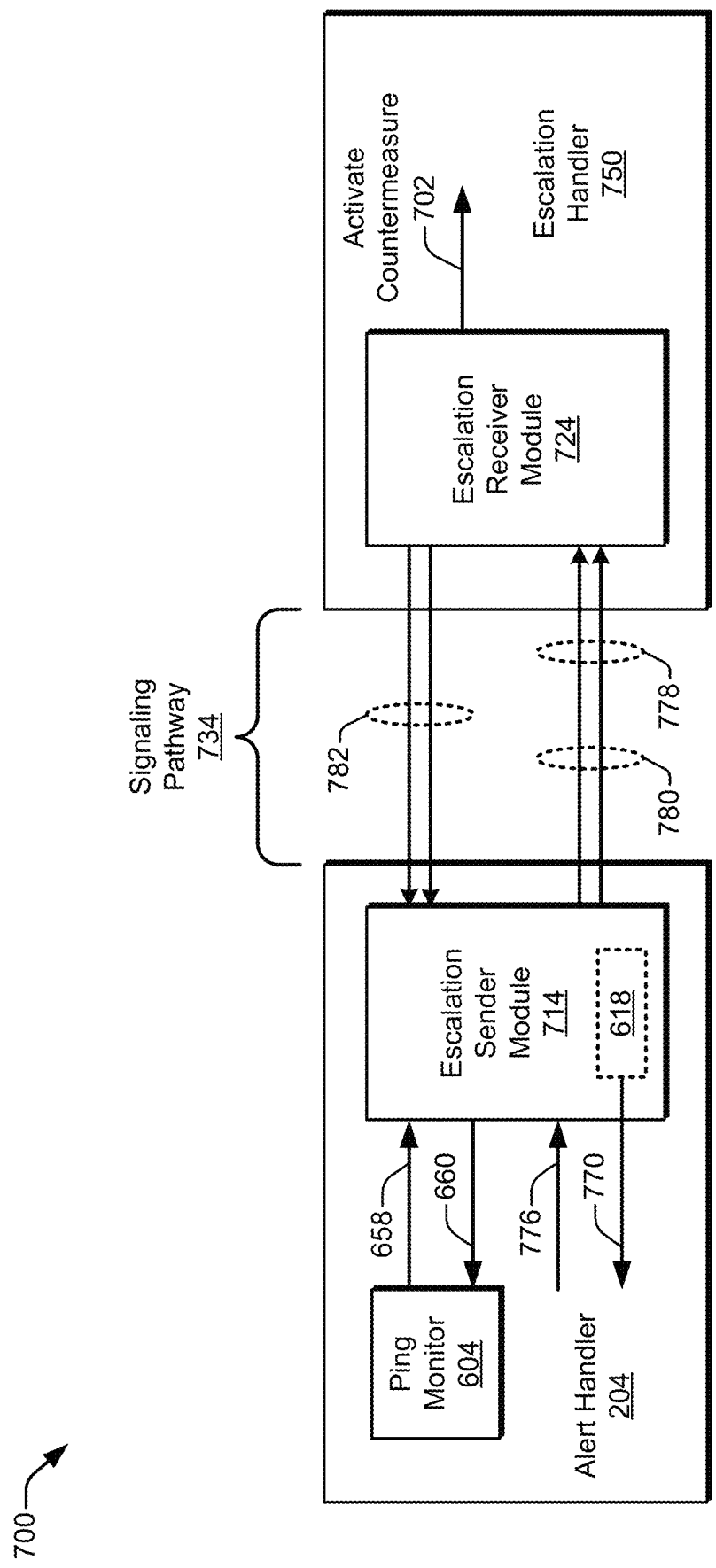
FIG. 7 illustrates an example communication relationship between an escalation sender module of an alert handler and an escalation receiver module of an escalation handler type of peripheral device.

FIG. 7 illustrates an example communication relationship 700 between an escalation sender module 714 of an alert handler 204 and an escalation receiver module 724 of an escalation handler 750, which is a type of peripheral device. As shown, the signaling pathway 734 includes multiple pairs of wires (e.g., two pairs) to enable differential signaling across two differential paths. Each pair of wires includes a plus wire and a minus wire. The modules can communicate at least synchronously across the signaling pathway 734. In example implementations, the escalation handler 750 performs or at least starts a security countermeasure based on an activate countermeasure instruction 702.

As part of an alert handling path within the alert handler 204, an escalation timer (not shown) provides an escalation instruction 776 to the escalation sender module 714. In response to receiving the escalation instruction 776, the escalation sender module 714 transmits an escalate command 778 to the escalation receiver module 724 on a second pair of wires (e.g., the lower pair as depicted). Responsive to receiving the escalate command 778, the escalation receiver module 724 generates the activate countermeasure instruction 702. Accordingly, the escalation handler 750 at least initiates performance of a security countermeasure as described herein in response to the transmitted escalate command 778.

For a pinging protocol, the escalation sender module 714 receives a ping instruction 658 from the ping monitor 604. Prompted by the ping instruction 658, the escalation sender module 714 transmits a ping request 780 to the escalation receiver module 724 on the second pair of wires. To indicate that the connection to the escalation handler 750 is live and functional, the escalation receiver module 724 transmits a ping response 782 back to the escalation sender module 714 on a first pair of wires (e.g., the upper pair as depicted). The escalation sender module 714 receives the ping response 782 from the escalation receiver module 724. To complete the ping protocol loop, the escalation sender module 714 forwards a ping okay message 660 to the ping monitor 604 responsive to receipt of the ping response 782.

In some cases, at least a portion of the integrity failure circuitry 618 is coupled to or incorporated into the escalation sender module 714. This integrity failure circuitry 618 monitors at least one pair of wires to determine if proper differential signaling is extant on the differential path and that expected signaling patterns match actual signaling patterns. If not, the integrity failure circuitry 618 generates an escalation integrity failure signal 770 and provides this signal to the controller (not shown) of the alert handler 204 as an internal alert of the alert handler 204.

In some implementations, for each of S escalation severities (where S represents a positive integer, like four), the alert handler 204 instantiates an escalation sender module 714. The corresponding S escalation handlers 750 each instantiate a corresponding escalation receiver module 724. The escalation signaling mechanism can be similar to the alert signaling mechanism. The escalation signaling mechanism, however, can be a fully synchronous protocol if the escalation handlers 750 are in the same clock domain as the alert handler 204. To facilitate the synchronous communication, the escalation sender modules 714 and the escalation receiver modules 724 can use the same clock and reset signals.

As shown in FIG. 7, each sender-receiver pair is connected with two differential line pairs. One pair extends from the sender to the receiver, and the other pair extends from the receiver to the sender. Upon receiving an escalation instruction signal 776 having a pulse width of K>0, the escalation sender module 714 encodes that signal as a differential pulse of width (K+1) on the differential path for the ping request 780 (e.g., on the second pair of wires). The escalation receiver module 724 decodes that message and asserts the activate countermeasure 702 output after one cycle (or one timeslot) of delay. Further, the escalation receiver module 724 acknowledges receipt of that message by continuously toggling the plus/minus signals on the first pair of wires while the escalate command 778 is asserted. A failure by the escalation receiver module 724 to respond correctly triggers an escalation integrity failure signal 770 from the integrity failure circuitry 618.

Further, a differential signaling mismatch on either of the pairs of wires also triggers an alert for an escalation integrity failure 770. Mismatches on the first pair of wires for the ping responses and the acknowledgments can be directly detected at the escalation sender module 714. Mismatches on the second pair of wires for the escalate commands and the ping requests are signaled back to the escalation sender module 714 by the escalation receiver module 724, which can also include integrity failure circuitry (not shown) to enable detection of mismatches on the second pair of wires. To perform this signaling, the escalation receiver module 724 can set both the plus and minus response wires of the first pair of wires to the same value and toggle that value each clock cycle or timeslot. This implicitly triggers an escalation signal integrity alert on the sender side. This back-signaling mechanism can be leveraged to fast-track escalation and use another countermeasure in case the alert handler 204 detects that a particular escalation signaling path has been tampered with.

In some implementations, ping testing of the escalation handlers is similar to that for the alert signaling scheme. The escalation signaling lines can be pinged and/or line tested in order to determine whether the escalation receiver module 724 has been tampered with. This can be achieved by asserting the input for the ping instruction 658 at the escalation sender module 714. A ping request 780 is encoded as a single cycle pulse on the second pair of wires, which are also used for transmission of the escalate command 778. With the single cycle pulse for the ping request 780, however, the escalation receiver module 724 does not decode this single-cycle pulse signaling as an escalate command. Instead, the escalation receiver module 724 responds with a "1010" pattern on the first pair of wires to communicate the ping response 782.

In response to the ping response 782, the escalation sender module 714 asserts the ping okay message 660 if the expected pattern is received correctly after one cycle of latency. Otherwise, the escalation sender module 714 first asserts the escalation integrity failure signal 770 to notify the controller of the alert handler 204. Later, after the programmable ping timeout is reached, the ping monitor 604 raises a "ping fail" alert using the escalation ping failure signal (not shown). The escalation sender module 714 triggers the escalation integrity failure signal 770 in this case because "no ping response" and "wrong ping response" are ambiguous in this context.

Further, in this escalation and countermeasure context, the escalation signal takes precedence over ping messaging. Accordingly, a ping instruction 658 is acknowledged with a ping okay message 660 if the escalation instruction 776 is already asserted. An ongoing ping sequence is also aborted if the escalation instruction 776 becomes asserted. In some cases, the ping and escalation response sequences are expected to start one cycle after either a ping request or an escalate command has been signaled. Otherwise, the escalation sender module 714 asserts the escalation integrity failure signal 770.

Having generally described schemes, techniques, and hardware for peripheral device comportability with security circuitry, this discussion now turns to example methods.

Example Methods for Peripheral Device Comportability with Security Circuitry

Figure 8:
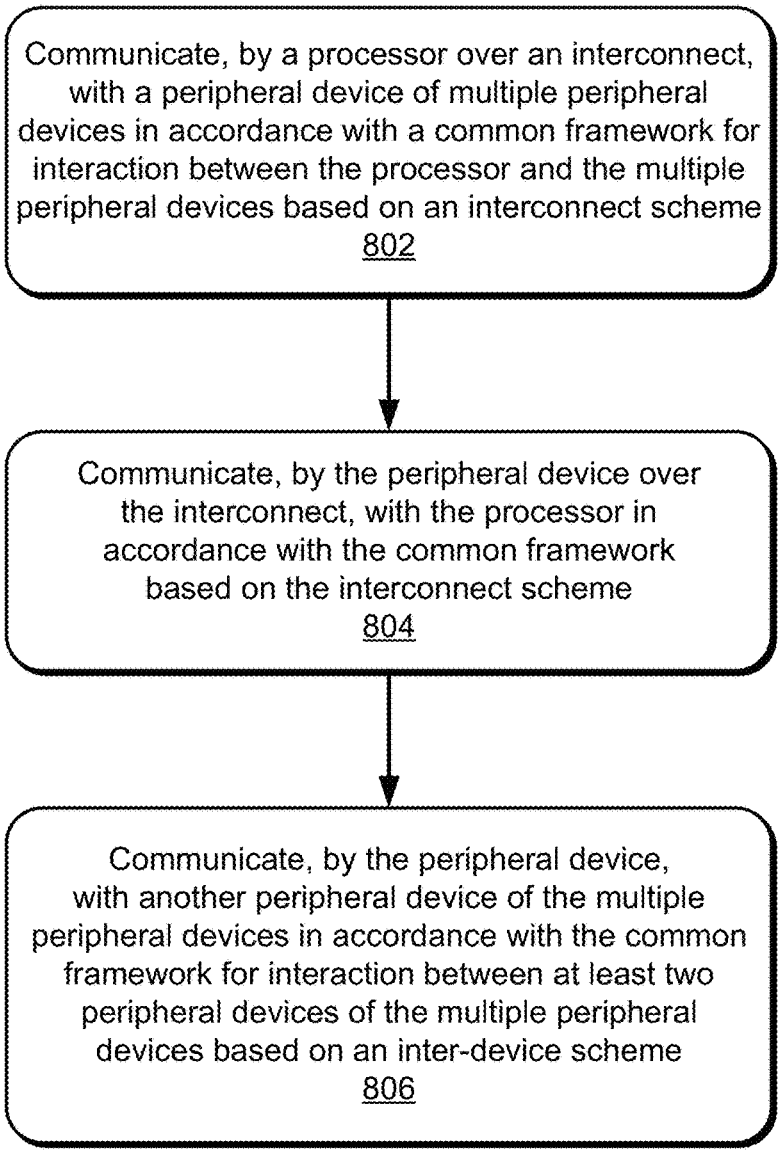
FIG. 8 illustrates example methods for an apparatus to implement peripheral device comportability with security circuitry.

Example methods are described below with reference to the flow diagrams of FIGS. 8 and 9. FIG. 8 illustrates, with the flow diagram 800, example methods for an apparatus to implement peripheral device comportability with security circuitry. The flow diagram 800 includes three blocks 802-806.

At block 802, a processor communicates over an interconnect with a peripheral device of multiple peripheral devices in accordance with a common framework for interaction between the processor and the multiple peripheral devices based on an interconnect scheme. For example, a processor 202 can communicate over an interconnect 110 with a peripheral device 250-P of multiple peripheral devices 250-1 . . . 250-P in accordance with a common framework for interaction between the processor 202 and the multiple peripheral devices 250-1 . . . 250-P based on an interconnect scheme 404. For instance, software executing on the processor 202 may communicate with the peripheral device 250-P using circuitry that is fabricated based on the interconnect scheme 404.

At block 804, a peripheral device communicates over the interconnect with the processor in accordance with the common framework based on the interconnect scheme. For example, the peripheral device 250-P can communicate over the interconnect 110 with the processor 202 in accordance with the common framework based on the interconnect scheme 404. In some cases, the peripheral device 250-P may respond to software executing on the processor 202, like by providing decryption result, using the interconnect 110. Alternatively, if interrupts are communicated via the interconnect 110, an interrupt signal 506 may be transmitted to interrupt-handling circuitry of the processor 202.

At block 806, the peripheral device communicates with another peripheral device of the multiple peripheral devices in accordance with the common framework for interaction between at least two peripheral devices of the multiple peripheral devices based on an inter-device scheme. For example, the peripheral device 250-P can communicate with another peripheral device 250-1 of the multiple peripheral devices 250-1 . . . 250-P in accordance with the common framework for interaction between at least two peripheral devices of the multiple peripheral devices 250-1 . . . 250-P based on an inter-device scheme 406. To do so, the peripheral device 250-P may transmit at least one signal to the peripheral device 250-1 using circuitry (e.g., one or more wires, buffers, or modules) and a communication protocol 320 that is established based on the inter-device scheme 406 of an interface specification 402.

FIG. 9 illustrates, with the flow diagram 900, additional example methods for an apparatus to implement peripheral device comportability with security circuitry. The flow diagram 900 includes three blocks 902-906.

At block 902, an electronic device receives a peripheral device design code corresponding to a peripheral device for security circuitry, with the peripheral device design code including one or more indications of inter-device signaling. For example, a comportability analysis module 410 executing on an electronic device 1000 (of FIG. 10 as described below) can receive a peripheral device design code 412 corresponding to a peripheral device 250 for security circuitry 106, with the peripheral device design code 412 including one or more indications of inter-device signaling 420. The one or more indications of inter-device signaling 420 may include, for instance, a name and other attributes for signals that are to be communicated between at least two peripheral devices, like at least one inter-device communication 316.

At block 904, the electronic device analyzes the peripheral device design code, including comparing the one or more indications of inter-device signaling to an inter-device scheme of an interface specification for a common framework for communicating at least within the security circuitry. For example, the comportability analysis module 410 executing on the electronic device 1000 can analyze the peripheral device design code 412 including comparing the one or more indications of inter-device signaling 420 to an inter-device scheme 406 of an interface specification 402 for a common framework for communicating at least within the security circuitry 106. In some cases, the comportability analysis module 410 may ensure that the one or more indications of inter-device signaling 420 conform to the conventions set forth in the inter-device scheme 406 in terms of the presence, syntax, and relationships between two or more permitted attributes.

At block 906, responsive to the analyzing, the electronic device provides a comportability report indicative of whether the peripheral device design code is consistent with the inter-device scheme of the interface specification. For example, responsive to the analysis, the comportability analysis module 410 of the electronic device 1000 can provide a comportability report 416 indicative of whether the peripheral device design code 412 is consistent with the inter-device scheme 406 of the interface specification 402. Here, as part of generating the comportability report 416, the comportability analysis module 410 may identify at least one inter-device signaling indication 420 that fails to abide by the inter-device scheme 406. The comportability analysis module 410 may also include in the comportability report 416 a reference to a relevant part of the interface specification 402 or a hint about fixing the infraction to bring the inter-device signaling indication 420 into compliance with the inter-device scheme 406.

Aspects of these methods may be implemented in, for example, hardware (e.g., fixed logic circuitry or a processor in conjunction with a memory), firmware, software, or some combination thereof. The methods may be realized using one or more of the apparatuses or components shown in FIGS. 1 to 7 and 10, which components may be further divided, combined, and so on. The devices and components of these figures generally represent hardware, such as electronic devices, PCBs, packaged modules, IC chips, components, or circuits; firmware; software; or a combination thereof. Thus, these figures illustrate some of the many possible systems or apparatuses capable of implementing the described methods.

For the methods described herein and the associated flow diagram(s), the orders in which operations are shown and/or described are not intended to be construed as a limitation. Instead, any number or combination of the described method operations can be combined in any order to implement a given method or an alternative method. Operations may also be omitted from or added to the described methods. Further, described operations can be implemented in fully or partially overlapping manners.

Figure 10:
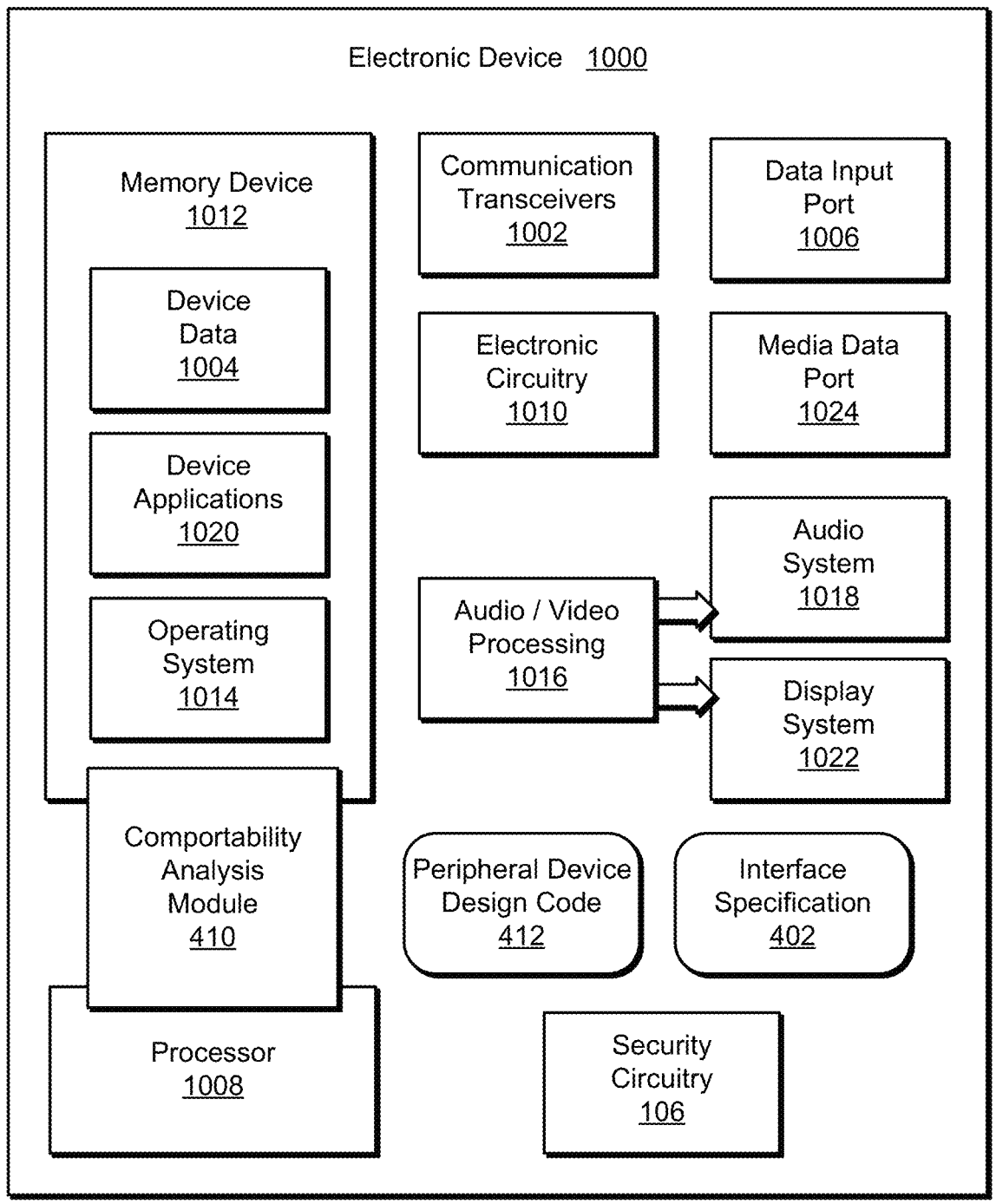
FIG. 10 illustrates various components of an example electronic device that can implement peripheral device comportability with security circuitry in accordance with one or more described aspects.

Example Electronic Devices for Peripheral Device Comportability with Security Circuitry FIG. 10 illustrates various components of an example electronic device 1000 that can implement peripheral device comportability with security circuitry in accordance with one or more described aspects. The electronic device 1000 may be implemented as any one or combination of a fixed, mobile, stand-alone, or embedded device; in any form of a consumer, computer, portable, user, server, communication, phone, navigation, gaming, audio, camera, messaging, media playback, and/or other type of electronic device 1000, such as the smartphone that is depicted in FIG. 1 as the apparatus 102. One or more of the illustrated components may be realized as discrete components or as integrated components on at least one integrated circuit of the electronic device 1000.

The electronic device 1000 can include one or more communication transceivers 1002 that enable wired and/or wireless communication of device data 1004, such as received data, transmitted data, or other information identified above. Example communication transceivers 1002 include near-field communication (NFC) transceivers, wireless personal area network (PAN) (WPAN) radios compliant with various IEEE 802.15 (Bluetooth™) standards, wireless local area network (LAN) (WLAN) radios compliant with any of the various IEEE 802.11 (Wi-Fi™) standards, wireless wide area network (WAN) (WWAN) radios (e.g., those that are 3GPP-compliant) for cellular telephony, wireless metropolitan area network (MAN) (WMAN) radios compliant with various IEEE 802.16 (WiMAX™) standards, infrared (IR) transceivers compliant with an Infrared Data Association (IrDA) protocol, and wired local area network (LAN) (WLAN) Ethernet transceivers.

The electronic device 1000 may also include one or more data input ports 1006 via which any type of data, media content, and/or other inputs can be received, such as user-selectable inputs, messages, applications, music, television content, recorded video content, and any other type of audio, video, and/or image data received from any content and/or data source, including a sensor like a microphone or a camera. The data input ports 1006 may include USB ports, coaxial cable ports, fiber optic ports for optical fiber interconnects or cabling, and other serial or parallel connectors (including internal connectors) for flash memory, DVDs, CDs, and the like. These data input ports 1006 may be used to couple the electronic device to components, peripherals, or accessories such as keyboards, microphones, cameras, or other sensors.

The electronic device 1000 of this example includes at least one processor 1008 (e.g., any one or more of application processors, microprocessors, digital-signal processors (DSPs), controllers, and the like), which can include a combined processor and memory system (e.g., implemented as part of an SoC), that processes (e.g., executes) computer-executable instructions to control operation of the device.

The processor 1008 may be implemented as an application processor, embedded controller, microcontroller, security processor, artificial intelligence (AI) accelerator, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other materials.

Alternatively or additionally, the electronic device 1000 can be implemented with any one or combination of electronic circuitry, which may include software, hardware, firmware, or fixed logic circuitry that is implemented in connection with processing and control circuits, which are generally indicated at 1010 (as electronic circuitry 1010). This electronic circuitry 1010 can implement executable or hardware-based modules (not shown in FIG. 10), such as through processing/computer-executable instructions stored on computer-readable media, through logic circuitry and/or hardware (e.g., such as an FPGA), and so forth.

Although not shown, the electronic device 1000 can include a system bus, interconnect, crossbar, data transfer system, or other switch fabric that couples the various components within the device. A system bus or interconnect can include any one or a combination of different bus structures, such as a memory bus or memory controller, a peripheral bus, a universal serial bus, and/or a processor or local bus that utilizes any of a variety of bus architectures.

The electronic device 1000 also includes one or more memory devices 1012 that enable data storage, examples of which include random access memory (RAM), non-volatile memory (e.g., read-only memory (ROM), flash memory, EPROM, and EEPROM), and a disk storage device. Thus, the memory device(s) 1012 can be distributed across different logical storage levels of a system as well as at different physical components. The memory device(s) 1012 provide data storage mechanisms to store the device data 1004, other types of code and/or data, and various device applications 1020 (e.g., software applications or programs). For example, an operating system 1014 can be maintained as software instructions within the memory device 1012 and executed by the processor 1008.

In some implementations, the electronic device 1000 also includes an audio and/or video processing system 1016 that processes audio data and/or passes through the audio and video data to an audio system 1018 and/or to a display system 1022 (e.g., a video buffer or a screen of a smartphone or camera). The audio system 1018 and/or the display system 1022 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, video bus, or other similar communication link, such as a media data port 1024. In some implementations, the audio system 1018 and/or the display system 1022 are external or separate components of the electronic device 1000. Alternatively, the display system 1022, for example, can be an integrated component of the example electronic device 1000, such as part of an integrated touch interface.

The electronic device 1000 of FIG. 10 is an example implementation of the apparatus 102 of FIG. 1, an example implementation of a device that can implement the analysis 414 of FIG. 4, and an example implementation of a device that can implement any of the methods of FIGS. 8 and 9. The electronic device 1000 can thus include security circuitry 106, which can be a separate IC chip or included as part of another IC chip or device, like the processor 1008, the electronic circuitry 1010, or the memory device 1012. Accordingly, one or more of the illustrated components may be integrated on the same IC chip, like an SoC, or at least on a single PCB. As shown, the electronic device 1000 may additionally or alternatively include a comportability analysis module 410. For instance, the memory device 1012 may store the comportability analysis module 410, and the processor 1008 may execute the comportability analysis module 410. Accordingly, the memory device 1012 may also store peripheral device design code 412, an interface specification 402, and so forth. The electronic device 1000 can alternatively access the interface specification 402 or the peripheral device design code 412 using the communication transceivers 1002 or the data input port 1006. The principles of peripheral device comportability with security circuitry as described herein can therefore be implemented by, or in conjunction with, the electronic device 1000 of FIG. 10.

Additional Examples

In the following, some examples are described.

Example 1: An integrated circuit including security circuitry, the security circuitry comprising: an interconnect; a processor coupled to the interconnect; and multiple peripheral devices, each respective peripheral device coupled to the interconnect and including an interface configured to adhere to a common framework for interacting with the processor and with other peripheral devices of the multiple peripheral devices, the interface comprising: an interconnect interface configured to couple the respective peripheral device to the interconnect; and an inter-device interface configured to couple the respective peripheral device to the other peripheral devices of the multiple peripheral devices.

Example 2: The integrated circuit of example 1, wherein each respective peripheral device includes a respective security function module configured to provide a respective security-related function.

Example 3: The integrated circuit of example 1 or 2, wherein the respective security-related function comprises at least one of: alert handling; cryptographic operations; secure data storage; random-number generation; or input/output communication for the security circuitry.

Example 4: The integrated circuit of any of the preceding examples, wherein the inter-device interface is coupled to at least one wire that extends to another peripheral device of the multiple peripheral devices responsive to an attribute included in design code for the respective peripheral device.

Example 5: The integrated circuit of any of the preceding examples, wherein the interface comprises a clock interface that includes access to: a primary system clock, the respective peripheral device configured to access the interconnect based at least on the primary system clock; and one or more secondary system clocks, the respective peripheral device configured to perform a function or communicate with another peripheral device of the multiple peripheral devices based on the one or more secondary system clocks.

Example 6: The integrated circuit of any of the preceding examples, wherein: the respective peripheral device includes a register interface, the register interface comprising at least one interrupt entry for an interrupt associated with the respective peripheral device; and the respective peripheral device is configured to expose at least part of the register interface to the processor.

Example 7: The integrated circuit of any of the preceding examples, wherein: the at least one interrupt entry comprises: an interrupt enable indication; an interrupt state indication; and an interrupt test register; and the respective peripheral device is configured to provide the processor access to clear the interrupt state indication.

Example 8: The integrated circuit of any of the preceding examples, wherein: the respective peripheral device of the multiple peripheral devices includes at least one alert sender module; and the alert sender module is configured to transmit an alert indication from the respective peripheral device via a signaling pathway.

Example 9: The integrated circuit of any of the preceding examples, wherein: the signaling pathway comprises at least one differential path; and the alert sender module is configured to transmit an alert integrity failure signal responsive to detection of an integrity failure of the at least one differential path of the signaling pathway.

Example 10: The integrated circuit of any of the preceding examples, wherein the integrated circuit comprises at least one of: a system-on-a-chip (SoC); or a root of trust (RoT) chip.

Example 11: A method for peripheral device comportability with security circuitry, the method comprising: communicating, by a processor over an interconnect, with a peripheral device of multiple peripheral devices in accordance with a common framework for interaction between the processor and the multiple peripheral devices based on an interconnect scheme; communicating, by the peripheral device over the interconnect, with the processor in accordance with the common framework based on the interconnect scheme; and communicating, by the peripheral device, with another peripheral device of the multiple peripheral devices in accordance with the common framework for interaction between at least two peripheral devices of the multiple peripheral devices based on an inter-device scheme.

Example 12: The method of example 11, wherein the communicating, by the peripheral device, with the other peripheral device of the multiple peripheral devices comprises: bypassing, by the peripheral device, the interconnect to communicate with the other peripheral device.

Example 13: The method of example 11 or 12, wherein the communicating, by the peripheral device, with the other peripheral device of the multiple peripheral devices comprises: transmitting, by the peripheral device, an inter-device signal to the other peripheral device using circuitry derived from an attribute specified by design code for the peripheral device.

Example 14: The method of any one of examples 11 to 13, wherein: the communicating, by the peripheral device over the interconnect, with the processor comprises transmitting, by the peripheral device, an interrupt signal to the processor based on an interrupt state indication of an interrupt entry of the peripheral device; and the communicating, by the processor over the interconnect, with the peripheral device comprises clearing the interrupt state indication of the interrupt entry.

Example 15: The method of any one of examples 11 to 14, wherein: the communicating, by the peripheral device, with the other peripheral device of the multiple peripheral devices comprises receiving, by the peripheral device, an escalate command from the other peripheral device, the other peripheral device comprising an alert handler; and the method further comprises activating, by the peripheral device, a countermeasure responsive to the receiving of the escalate command from the alert handler.

Example 16: A method for peripheral device comportability with security circuitry, the method comprising: receiving a peripheral device design code corresponding to a peripheral device for the security circuitry, the peripheral device design code including one or more indications of inter-device signaling; analyzing the peripheral device design code including comparing the one or more indications of inter-device signaling to an inter-device scheme of an interface specification for a common framework for communicating at least within the security circuitry; and responsive to the analyzing, providing a comportability report indicative of whether the peripheral device design code is consistent with the inter-device scheme of the interface specification.

Example 17: The method of example 16, wherein: the one or more indications of inter-device signaling relate to signals exchanged between two or more peripheral devices without using an interconnect of the security circuitry; and the inter-device scheme establishes a format for defining inter-device signaling that bypasses the interconnect.

Example 18: The method of example 16 or 17, wherein the inter-device scheme comprises a mandatory portion and an optional portion.

Example 19: The method of any one of examples 16 to 18, wherein the peripheral device design code includes one or more indications of processor-device signaling, and the method further comprises: analyzing the peripheral device design code including comparing the one or more indications of processor-device signaling to an interconnect scheme of the interface specification for the common framework; and responsive to the analyzing that includes comparing the one or more indications of processor-device signaling, generating the comportability report to indicate whether the peripheral device design code is consistent with the interconnect scheme of the interface specification.

Example 20: The method of any one of examples 16 to 19, wherein the peripheral device design code includes one or more indications of interrupt signaling, and the method further comprises: analyzing the peripheral device design code including comparing the one or more indications of interrupt signaling to an interrupt scheme of the interface specification for the common framework; and responsive to the analyzing that includes comparing the one or more indications of interrupt signaling, generating the comportability report to indicate whether the peripheral device design code is consistent with the interrupt scheme of the interface specification.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for peripheral device comportability with security circuitry have been described in language specific to certain features and/or methods, the subject of the appended claims is not necessarily limited to the specific features or methods described. Rather, the specific features and methods are disclosed as example implementations for peripheral device comportability with security circuitry.

What is claimed is:

1. An apparatus comprising:
an integrated circuit chip including security circuitry, the security circuitry comprising:
an interconnect;
a processor coupled to the interconnect;
at least one bus; and
multiple peripheral devices,
each respective peripheral device coupled to the interconnect and the at least one bus,
each respective peripheral device including an interface configured to adhere to a common framework for interacting with the processor and with one or more other peripheral devices of the multiple peripheral devices, the interface comprising:
an interconnect interface configured to couple the respective peripheral device to the interconnect, the respective peripheral device configured to communicate with the processor via the interconnect using the interconnect interface; and
an inter-device interface configured to couple the respective peripheral device to the one or more other peripheral devices of the multiple peripheral devices, the respective peripheral device configured to communicate with the one or more other peripheral devices of the multiple peripheral devices via the at least one bus using the inter-device interface, and
each respective peripheral device including a register interface, the register interface comprising at least one interrupt entry for an interrupt associated with the respective peripheral device, the respective peripheral device configured to expose at least part of the register interface to the processor.

2. The apparatus of claim 1, wherein each respective peripheral device includes a respective security function module configured to provide a respective security-related function.

3. The apparatus of claim 2, wherein the respective security-related function comprises at least one of:
alert handling;
cryptographic operations;
secure data storage;
random-number generation; or
input/output communication for the security circuitry.

4. The apparatus of claim 1, wherein the inter-device interface is coupled to at least one wire that extends to another peripheral device of the multiple peripheral devices responsive to an attribute included in design code for the respective peripheral device.

5. The apparatus of claim 1, wherein the interface comprises a clock interface that includes access to:
a primary system clock, the respective peripheral device configured to communicate with the processor via the interconnect based at least on the primary system clock; and
one or more secondary system clocks, the respective peripheral device configured to perform a function or communicate with another peripheral device of the multiple peripheral devices via the at least one bus based at least on the one or more secondary system clocks.

6. The apparatus of claim 1, wherein the at least one interrupt entry comprises at least one of:
an interrupt enable indication configured to establish whether the at least one interrupt entry is activated for use; or
an interrupt test register configured to enable the processor to trigger an interrupt to test the at least one interrupt entry.

7. The apparatus of claim 1, wherein:
the at least one interrupt entry comprises an interrupt state indication; and
the respective peripheral device is configured to provide the processor access to clear the interrupt state indication.

8. The apparatus of claim 1, wherein:
the respective peripheral device of the multiple peripheral devices includes at least one alert sender module; and
the at least one alert sender module is configured to transmit an alert indication from the respective peripheral device via a signaling pathway.

9. The apparatus of claim 8, wherein:
the signaling pathway comprises at least one differential path; and
the at least one alert sender module is configured to transmit an alert integrity failure signal responsive to detection of an integrity failure of the at least one differential path of the signaling pathway.

10. The apparatus of claim 1, wherein the integrated circuit chip comprises at least one of:
a system-on-a-chip (SoC); or
a root of trust (RoT) chip.

11. A method for peripheral device comportability with security circuitry that is part of an integrated circuit chip, the method comprising:
communicating, by a processor over an interconnect, with a peripheral device of multiple peripheral devices in accordance with a common framework for interaction between the processor and the multiple peripheral devices based on an interconnect scheme; the security circuitry comprising the processor, the multiple peripheral devices, the interconnect, and at least one bus; the peripheral device including an interface comprising an interconnect interface and an inter-device interface;
communicating, by the peripheral device over the interconnect and using the interconnect interface, with the processor in accordance with the common framework based on the interconnect scheme;
communicating, by the peripheral device over the at least one bus and using the inter-device interface, with another peripheral device of the multiple peripheral devices in accordance with the common framework for interaction between at least two peripheral devices of the multiple peripheral devices based on an inter-device scheme; and exposing, by the peripheral device and to the processor, at least part of a register interface of the peripheral device, the register interface comprising at least one interrupt entry for an interrupt associated with the respective peripheral device.

12. The method of claim 11, wherein the communicating, by the peripheral device over the at least one bus and using the inter-device interface, with the other peripheral device of the multiple peripheral devices comprises:

bypassing, by the peripheral device, the interconnect to communicate with the other peripheral device.

13. The method of claim 11, wherein the communicating, by the peripheral device over the at least one bus and using the inter-device interface, with the other peripheral device of the multiple peripheral devices comprises:

transmitting, by the peripheral device, an inter-device signal to the other peripheral device using circuitry derived from an attribute specified by design code for the peripheral device.

14. The method of claim 11, wherein:

the communicating, by the peripheral device over the interconnect and using the interconnect interface, with the processor comprises transmitting, by the peripheral device, an interrupt signal to the processor based on an interrupt state indication of an interrupt entry of the peripheral device; and the communicating, by the processor over the interconnect, with the peripheral device comprises clearing the interrupt state indication of the interrupt entry.

15. The method of claim 11, wherein:

the communicating, by the peripheral device over the at least one bus and using the inter-device interface, with the other peripheral device of the multiple peripheral devices comprises receiving, by the peripheral device, an escalate command from the other peripheral device, the other peripheral device comprising an alert handler; and the method further comprises activating, by the peripheral device, a countermeasure responsive to the receiving of the escalate command from the alert handler.

16. The method of claim 11, wherein:

inter-device signaling relates to signals exchanged between two or more peripheral devices of the multiple peripheral devices over the at least one bus without using the interconnect of the security circuitry; and the inter-device scheme establishes a format for defining the inter-device signaling to bypass the interconnect.

17. The method of claim 11, wherein the inter-device scheme comprises a mandatory portion and an optional portion.

18. The method of claim 11, wherein:

processor-device signaling relates to signals exchanged between the processor and a peripheral device of the multiple peripheral devices over the interconnect without using the at least one bus of the security circuitry; and the interconnect scheme establishes a format for defining the processor-device signaling to bypass the at least one bus.

19. The method of claim 18, wherein:

interrupt signaling relates to signals exchanged between the processor and a peripheral device of the multiple peripheral devices over the interconnect without using the at least one bus of the security circuitry; and the interconnect scheme establishes a format for defining the interrupt signaling to bypass the at least one bus.

20. The apparatus of claim 1, wherein the at least one bus is dedicated to the multiple peripheral devices.

* * * * *